US012402627B2

(12) United States Patent
Barter et al.

(10) Patent No.: US 12,402,627 B2
(45) Date of Patent: Sep. 2, 2025

(54) METAL COMPLEXES FOR PROMOTING GROWTH IN A PHOTOSYNTHETIC ORGANISM

(71) Applicant: Imperial College Innovations Limited, London (GB)

(72) Inventors: Laura Barter, Reading (GB); Nicholas Long, Hurst (GB); Jonathan Rains, Staines-upon-Thames (GB); Rudiger Woscholski, London (GB)

(73) Assignee: IMPERIAL COLLEGE INNOVATIONS LIMITED, London (GB)

( * ) Notice: Subject to any disclaimer, the term of this patent is extended or adjusted under 35 U.S.C. 154(b) by 948 days.

(21) Appl. No.: 17/289,677

(22) PCT Filed: Oct. 31, 2019

(86) PCT No.: PCT/GB2019/053083
§ 371 (c)(1),
(2) Date: Apr. 28, 2021

(87) PCT Pub. No.: WO2020/089630
PCT Pub. Date: May 7, 2020

(65) Prior Publication Data
US 2021/0400980 A1 Dec. 30, 2021

(30) Foreign Application Priority Data
Oct. 31, 2018 (GB) ...................... 1817792

(51) Int. Cl.
*A01N 55/02* (2006.01)
*A01N 43/52* (2006.01)
*A01N 43/78* (2006.01)
*A01P 21/00* (2006.01)

(52) U.S. Cl.
CPC ............ *A01N 55/02* (2013.01); *A01N 43/52* (2013.01); *A01N 43/78* (2013.01); *A01P 21/00* (2021.08)

(58) Field of Classification Search
CPC .......... C07F 3/06; A01P 21/00; A01N 55/02; A01N 43/52
See application file for complete search history.

(56) References Cited

U.S. PATENT DOCUMENTS

2013/0330801 A1* 12/2013 Rambo .................. C12N 11/14
435/289.1

FOREIGN PATENT DOCUMENTS

| CN | 106008561 A | 10/2016 |
|---|---|---|
| CN | 107513077 A | 12/2017 |
| WO | WO 2009/038685 A1 | 3/2009 |

OTHER PUBLICATIONS

Xu, J., et al. PloS one 7.5 (2012): e37438. (Year: 2012).*
Ibrahim, M. et al., "Synthesis and characterization of benzimidazole-based zinc complexes as structural carbonic acid anhydrase models and their applications towards $CO_2$ hydration", Journal of Molecular Structure, vol. 985, No. 2-3, 2011, pp. 191-201.
Klinkel, et al., "Effect of ligand modifications and varying metal-to-ligand ratio on the catalyzed hydrolysis of phosphorus triesters by bimetallic tetrabenzimidazole complexes", Journal of Molecular Catalysis A: Chemical, vol. 267, No. 1-2, 2007, pp. 173-180.
Li, et al., "Crystal structure of chloro-aqua(bis(benzimidazol-2-yl-methyl)-aimine)-zinc(II)perchlorate monohydrate, [$ZnCl(H_2O)(C_{16}H_{15}N_5)$]$ClO_4.H_2O$, C16H19Cl2N5O6Zn", Zeitschrift fur Kristallographie—New Crystal Structures, vol. 227, No. 3, 2014, pp. 369-370; DOI10.1524/ncrs.2012.0177.
Nakata, et al., "Kinetic study of catalytic $CO_2$ hydration by water-soluble model compound of carbonic anhydrase and anion inhibition effect on $CO_2$ hydration", Journal of Inorganic Biochemistry, vol. 89, No. 3-4, 2002, pp. 255-266; ISSN: 0162-0134, DOI 10.1016/S0162-0134(01)00419-6/.
Pan, et al., "Anions, solvents and spacer ligands assisted hydrogen-bonding coordination frameworks from tripodal ntb ligands", Journal of Molecular Structure, vol. 980, No. 1-3, 2010, pp. 193-200;doi:10.1016/j.molstruc.2010.07.013.
Shen, et al., "Synthesis, structure, electrochemical properties, and antioxidant activities of copper (II) and zinc(II) complexes with N,N-bis(N-ethyl-2-ylmethylbenzimidazol)allylamine ligand", Journal of Coordination Chemistry, vol. 71, No. 7, Mar. 30, 2018, pp. 980-990; DOI 10.1080/00958972.2018.1454593.
Xiao, et al., "Aqua{tris[(1H-benzimidaz ol-2-yl-kN3)-methyl]amine}zinc 5-(dimethylamino)-naphthalene-1-sulfonate perchlorate 2.5 hydrate", Acta Crystallographic Section E, E67, 2011, m1755.
Great Britain Search Report for patent application No. GB1817792.3 dated Apr. 23, 2019.
International Search Report and Written Opinion of PCT/GB2019/053083 dated Feb. 24, 2020, 11 pages.

(Continued)

Primary Examiner — Joseph K McKane
Assistant Examiner — Quincy McKoy
(74) Attorney, Agent, or Firm — Squire Patton Boggs (US) LLP

(57) ABSTRACT

A method of promoting growth in a photosynthetic organism comprising treating the photosynthetic organism with a metal complex or a precursor thereof, wherein the metal complex comprises a metal selected from the group consisting of zinc (Zn), cobalt (Co), copper (Cu), nickel (Ni) and iron (Fe), and a ligand, which is a bidentate or tridentate ligand. Metal complexes and their ligands are also described.

20 Claims, 7 Drawing Sheets

(56) References Cited

OTHER PUBLICATIONS

Sandra Hübner et al., "Why Does Industry Not Use Immobilized Transition Metal Complexes as Catalysts?", Advanced Synthesis & Catalysis, vol. 358, 2016, pp. 3-25.

* cited by examiner

METAL COMPLEXES FOR PROMOTING GROWTH IN A PHOTOSYNTHETIC ORGANISM

CROSS-REFERENCE TO RELATED APPLICATIONS

This application is a national-stage filing under 37 USC 371 (c) of International Application No. PCT/GB2019/053083, filed Oct. 31, 2019, which claims priority to, and the benefit of, Patent Application GB1817792.3, filed Oct. 31, 2018, the entire contents of each of which are herein incorporated by reference in their entirety for all purposes.

FIELD OF THE INVENTION

The invention relates to a method of promoting growth in a photosynthetic organism. The invention also relates to metal complexes, to precursor compounds of the metal complexes for use in the method, and to formulations comprising the metal complexes or precursor compounds. The invention is also concerned with a method of preparing the metal complexes.

BACKGROUND TO THE INVENTION

One of the major challenges facing society today is to provide sufficient food, fuel and fibre for a rapidly growing world population. There is a need to provide more efficient and effective agricultural methods for producing foodstuff in an environmentally, socially and economically sustainable way. One way of improving the yields of crops is by modifying the traits of the crops. However, such approaches show little remaining potential for further improvement and alternative routes are required to obtain further yield growth.

Plants rely on photosynthesis to convert light energy into chemical energy, which is used to make cellulose for cell walls and proteins for growth and repair. Photosynthesis is surprisingly inefficient. Typically, the conversion of light energy into stored biomass within photosynthetic bacteria, green algae and higher plants is only of the order 1 to 2% efficient. The enzyme ribulose-1,5-biphosphate carboxylase/oxygenase (RuBisCO; referred to herein as "rubisco") catalyses the integration of $CO_2$ into organic carbon for biomass (i.e. carbon fixation) by the process of photosynthesis. Rubisco is one of the slowest known enzymes with a typical catalytic rate of 3 to 10 molecules per second. It is also highly unspecific to $CO_2$. Its activity can be inhibited through a competing reaction with $O_2$ called photorespiration, which decreases the efficiency of carbon fixation by up to 50%. The activity of rubisco is therefore a significant bottleneck for photosynthetic efficiency.

In nature, some plants and cyanobacteria have developed carbon concentrating mechanisms that concentrate $CO_2$ around rubisco. An increased local concentration of $CO_2$ around rubisco can improve photosynthetic activity. Within these mechanisms, carbonic anhydrase ("CA"), more specifically R-CA, is used to transport and produce $CO_2$ for concentrating carbon around rubisco's active site. CA is the enzyme that catalyses the reversible interconversion between $CO_2$ and $HCO_3^-$, as shown in equation (1) below.

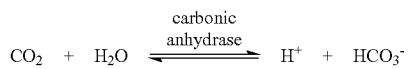

(1)

Some crops, such as rice, do not have a carbon concentrating mechanism and have low photosynthetic efficiencies. It is possible to improve the growth rates of such crops by enriching the local environment with $CO_2$ (J. A. Bunce; Crop Science, 54 (2014), 1744; and S. von Caemmerer et al., Science, 336 (2012), 1671). It is thought that this reduces the effects of the competing reaction with $O_2$.

WO 2012/125737 A2 describes a method of increasing the efficiency of carbon dioxide fixation in a photosynthetic organism. The method involves the creation and use of a transgenic plant that overexpresses a membrane bicarbonate transporter to assist carbonic anhydrase as part of the carbon fixation process.

Mammalian $\alpha$-CA preferentially catalyses the hydration reaction (i.e. conversion of $CO_2$ and $H_2O$ into $HCO_3^-$). Synthetic compounds that are intended to mimic mammalian $\alpha$-CA are known for use in capturing atmospheric $CO_2$ capture and converting it to $HCO_3^-$. For example, U.S. Pat. No. 9,259,725 describes zinc complexes for use in a catalytic carbon capture system. The zinc complexes comprise an acyclic ligand having at least one aza-containing moiety and at least one heterocyclic amine moiety.

K. Nakata et al. (J. Inorg. Biochem., 89 (2002), 255-266) describes a kinetic study of $CO_2$ hydration using a water-soluble zinc complex with a nitrilotris(2-benzimidazolylmethyl-6-sulfonate) ligand.

SUMMARY OF THE INVENTION

In a first aspect, the invention provides a method of promoting growth in a photosynthetic organism, such as in a plant, an algae or cyanobacteria. The method comprises treating a photosynthetic organism with a metal complex or a precursor thereof. The metal complex comprises a metal selected from the group consisting of zinc (Zn), cobalt (Co), copper (Cu), nickel (Ni) and iron (Fe). The metal complex further comprises a bidentate or tridentate ligand.

The ligand may have a structure represented by formula (Ia):

wherein:
the linker has a chain length of at least 3 atoms between $G_1$ and $G_2$;
each of $G_1$ and $G_2$ is a group for coordinating to the metal and each of $G_1$ and $G_2$ independently comprises a heterocyclic group as represented by formula (IIa):

and wherein $ring_1$ is directly bonded to the linker; and X is a heteroatom selected from nitrogen, sulfur and oxygen. The wavy line attached to $ring_1$ denotes the point of attachment of $G_1$ or $G_2$ to the linker. $Ring_1$ is not directly bonded to the linker at X. With reference to "X", the terms "$X_1$" and "$X_2$"

may be used herein to denote the individual identity of the moiety at position "X" for $G_1$ and $G_2$ respectively.

Previous studies have focused on using synthetic metal complexes as mimics of carbonic anhydrases for capturing carbon dioxide. These complexes hydrate carbon dioxide and shift the equilibrium shown in equation (1) above to the right in favour of forming $HCO_3^-$. The invention is based on the recognition that synthetic metal complexes can be used to produce carbon dioxide and thereby assist the photosynthesis process in photosynthetic organisms, particularly plants. Synthetic metal complexes can catalyse the production of carbon dioxide by shifting the equilibrium shown in equation (1) above to the left.

The inventors have surprisingly discovered a class of synthetic metal complexes that favour the dehydration reaction in equation (1) (i.e. conversion of $HCO_3^-$ to $CO_2$). In comparison to previously known metal complexes, the metal complexes of the invention have a ligand structure that alters their specificity in favour of the dehydration reaction.

In a second aspect, the invention provides a metal complex, which comprises a metal selected from the group consisting of zinc (Zn), cobalt (Co), copper (Cu), nickel (Ni) and iron (Fe), and a ligand having a structure represented by formula (Ia) above, wherein:
the linker has a chain length of at least 3 atoms between $G_1$ and $G_2$;
each of $G_1$ and $G_2$ is a group for coordinating to the metal and each of $G_1$ and $G_2$ independently comprises a heterocyclic group as represented by formula (IIa) above, and wherein ring$_1$ is directly bonded to the linker; and X is a heteroatom selected from nitrogen, sulfur and oxygen.

In a third aspect, the invention provides a method of preparing a metal complex. The method comprises:
mixing in solution (a) a salt of a metal selected from the group consisting of zinc (Zn), cobalt (Co), copper (Cu), nickel (Ni) and iron (Fe) with (b) a ligand having a structure represented by formula (Ia) above, wherein:
the linker has a chain length of at least 3 atoms between $G_1$ and $G_2$;
each of $G_1$ and $G_2$ is a group for coordinating to a metal of the metal complex and each of $G_1$ and $G_2$ independently comprises a heterocyclic group as represented by formula (IIa) above, and wherein ring$_1$ is directly bonded to the linker; and X is a heteroatom selected from nitrogen, sulfur and oxygen.

In a fourth aspect, the invention provides a formulation for treating a photosynthetic organism. The formulation comprises a metal complex or a precursor thereof in accordance with the invention, such as in the first to third aspects of the invention.

In a fifth aspect, the invention provides a ligand. The ligand is for use in preparing a metal complex in accordance with the invention. The ligand has a structure as described above, specifically the ligand is represented by formula (Ia):

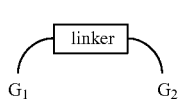

(Ia)

wherein:
the linker has a chain length of at least 3 atoms between $G_1$ and $G_2$;

each of $G_1$ and $G_2$ is a group for coordinating to a metal of the metal complex and each of $G_1$ and $G_2$ independently comprises a heterocyclic group as represented by formula (IIa):

(IIa)

and wherein ring$_1$ is directly bonded to the linker; and X is a heteroatom selected from nitrogen, sulfur and oxygen. The wavy line attached to ring$_1$ denotes the point of attachment of $G_1$ or $G_2$ to the linker. Ring$_1$ is not directly bonded to the linker at X.

The invention also relates to several uses of the metal complex or a precursor thereof as described in the second aspect of the invention or the formulation as described in the fourth aspect of the invention.

In a sixth aspect, the invention relates to the use of the metal complex or a precursor thereof or the formulation to (i) promote growth of a photosynthetic organism and/or (ii) promote or assist in the production of biomass in a photosynthetic organism, and/or (iii) to assist photosynthetic carbon fixation in a photosynthetic organism.

DEFINITIONS

Figure 1:
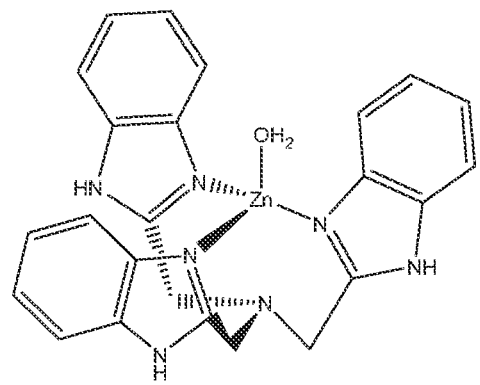
FIG. 1 shows a zinc complex of tris(2-benzimidazolylmethyl)amine, as described by K. Nakata et al. (*J. Inorg. Biochem.*, 89 (2002), 255-266).

As used herein and unless specified to the contrary, the following terms have the meaning indicated below.

The term "ring atoms" as used herein refers to the atoms in the framework of the ring(s). Thus, for example, the ring atoms of N-methylimidazole are the two nitrogen atoms and the three carbon atoms that form the imidazole ring framework. For N-methylbenzimidazole, the ring atoms are the two nitrogen atoms and the seven carbon atoms that form the benzimidazole ring framework.

The term "fluorophore group" as used herein refers to a substituent or group that is a fluorescent moiety that can re-emit light upon light excitation. Fluorophore groups typically contain several aromatic groups or are planar or cyclic molecules with a plurality of π bonds. In general, the fluorophore group is a small, organic moiety having from 20 to 100 atoms. Such groups or substituents are known in the art.

The fluorophore group may be a xanthene derivative, a cyanine derivative, a squaraine derivative or a ring-substituted squaraine, a naphthalene derivative, a coumarin derivative, an oxadiazole derivative, an anthracene derivative, a pyrene derivative, an oxazine derivative, an acridine derivative, an arylmethine derivative, a rhodol derivative, a tetrapyrrole derivative, a BODIPY™ derivative, a resorufin derivative or a quinine derivative. The xanthene derivative may, for example, be a fluorescein group, a rhodamine group (e.g. X-rhodamine, rhodamine B), an Oregon green group, an eosin group or a Texas red group. The cynanine derivative may, for example, be a cyanine group, an indocyanine green group, an oxacarbocyanine group, a thiacarbocyanine group, or a merocyanine group. The squaraine derivative or the ring-substituted squaraine may, for example, be a Seta™ group, a SeTau™ group, or a square Dye™ group (e.g. squarylium dye III). The naphthalene derivative may, for example, be a dansyl group or a prodan group. The coumarin derivative may, for example, be a hydroxycoumarin group, an aminocoumarin group or a methoxycoumarin group. The oxadiazole derivative may, for example, be a pyridyloxazole group, a nitrobenzoxadiazole group or a benzoxadiazole group. The anthracene derivative may, for example, be an anthraquinone group (e.g. DRAQ5™, DRAQ7™, CyTRAK™ Orange). The pyrene derivative may, for example, be a cascade blue group. The oxazine derivative may, for example, be a Nile red group, a Nile blue group, a cresyl violet group, or an oxazine 170 group. The acridine derivative may, for example, be a proflavine group, an acridine orange group, or an acridine yellow group. The arylmethine derivative may, for example, be an auramine group, a crystal violet group, or a malachite green group. The tetrapyrrole derivative may, for example, be a porphin group, a phthalocyanine group or a bilirubin group. The BODIPY™ derivative typically comprises a 4,4-difluoro-4-bora-3a,4a-diaza-s-indacene group. The resorufin derivative may comprise a 7-hydroxy-3H-phenoxazin-3-one group.

When the metal complex or ligand comprises a fluorophore group, then the fluorophore group is present as a substituent component of the ligand. The fluorophore group is attached to a coordinating group or linker of the ligand, preferably the coordinating group.

The term "precursor thereof" as used herein in the context of the metal complex refers to the ligand in accordance with the invention, such as in the fifth aspect of the invention, optionally in combination with a salt of the metal of the metal complex (i.e. zinc (Zn), cobalt (Co), copper (Cu), nickel (Ni) and iron (Fe)). The metal complex may be formed in situ by treating a photosynthetic organism with a precursor of the metal complex. Photosynthetic organisms, such as plants or algae, or the environment surrounding the organism, such as soil or water, may contain zinc (Zn), cobalt (Co), copper (Cu), nickel (Ni), iron (Fe) or compounds thereof. By applying the ligand to the photosynthetic organism or its surrounding environment, a metal complex may be formed in situ within the photosynthetic organism or the surrounding environment for uptake into the organism.

The term "water solubilising group" as used herein refers to a substituent or functional group that assists with solubilising, or imparts solubility to, the metal complex in water or an aqueous solution at a temperature of 20° C. under atmospheric pressure. Water solubilising groups are known in the art. The water solubilising group may be formed in situ when the metal complex is added to water or an aqueous solution. For example, the metal complex may comprise an ester group as a water solubilising group, which is part of the ligand. The ester group itself may not assist in solubilising the metal complex, but it may be hydrolysed in water to form a carboxylate group. The carboxylate group can assist in solubilising the metal complex in water or an aqueous solution.

The water solubilising group may comprise, or consist of, a group selected from a hydroxy group (—OH) or a salt or an ester thereof; a carboxylic acid group (—COOH) or a conjugate base, an ester, an anhydride or an amide thereof; an amine group (—N($R_a$)$_2$) or a conjugate acid, an amide, a carbamate, a carbamide or a sulfonamide thereof; a sulfonic acid group (—SO$_3$H) or a conjugate base, a sulfonic ester, a sulfonic anhydride or a sulfonamide thereof; a phosphonic acid group (—P(O)(OH)$_2$) or a conjugate base or a phosphonate ester thereof; a phosphoric acid group (—O—P(O)(OH)$_2$) or a conjugate base or a phosphate ester thereof; and a polyethylene glycol group (—[OCH$_2$CH$_2$]$_n$—OH or —CH$_2$CH$_2$—[OCH$_2$CH$_2$]$_n$—OH). For the amine group, each $R_a$ may independently be selected from hydrogen (—H) and $C_1$ to $C_3$ alkyl.

The term "heterocyclic group" as used herein generally refers to a stable ring radical comprising a total of 3 to 18 ring atoms (i.e. 3 to 18 membered ring), which comprises 2 to 12 carbon atoms and from 1 to 6 heteroatoms selected from nitrogen, oxygen and sulfur. Unless specifically stated otherwise, the heterocyclic group may be a monocyclic, bicyclic, tricyclic or tetracyclic ring system. When the heterocyclic group is polycyclic, then the heterocyclic group may include a fused or a bridged ring system. The heterocyclic group may be aromatic, partially saturated or fully saturated.

The "heterocyclic group", unless otherwise stated in the specification, may be optionally substituted by one or more substituents selected from $C_1$ to $C_6$ alkyl, $C_2$ to $C_6$ alkenyl, $C_2$ to $C_6$ alkynyl, halo, fluoro-($C_1$ to $C_6$ alkyl), cyano, nitro, $C_6$ to $C_{10}$ aryl, $C_3$ to $C_8$ carbocyclyl, $C_1$ to $C_6$ alkoxy, $C_6$ to $C_{10}$ aryloxy and $C_3$ to $C_8$ carbocyclyloxy.

The term "alkyl" as used herein refers to a straight or branched hydrocarbon chain radical consisting of carbon and hydrogen atoms, and containing no unsaturation. A "$C_1$ to $C_6$ alkyl" group contains one to six carbon atoms. Unless stated otherwise specifically in the specification, an alkyl group may be optionally substituted by one or more substituents selected from $C_2$ to $C_6$ alkenyl, $C_2$ to $C_6$ alkynyl, halo, fluoro-($C_1$ to $C_6$ alkyl), cyano, nitro, $C_6$ to $C_{10}$ aryl, $C_3$ to $C_8$ carbocyclyl, $C_1$ to $C_6$ alkoxy, $C_6$ to $C_{10}$ aryloxy and $C_3$ to $C_8$ carbocyclyloxy.

The term "fluoroalkyl" as used herein, such as fluoro-($C_1$ to $C_6$ alkyl), refers to an alkyl group or radical as defined above that is substituted by one or more fluoro groups, such as, for example, trifluoromethyl, difluoromethyl, fluoromethyl, 2,2,2-trifluoroethyl, 1-fluoromethyl or 2-fluoroethyl.

The term "alkenyl" as used herein refers to a straight or branched hydrocarbon chain radical group consisting of carbon and hydrogen atoms, and containing at least one carbon-carbon double bond. The term "alkynyl" as used herein refers to a straight or branched hydrocarbon chain radical group consisting of carbon and hydrogen atoms, containing at least one carbon-carbon triple bond.

The term "halo" or "halogen" as used herein refers to a bromo (—Br), chloro (—Cl), fluoro (—F) or an iodo (—I) substituent. The term "cyano" refers to the —CN group. The term "nitro" refers to the —$NO_2$ group.

The term "aryl" as used herein refers to a radical derived from an aromatic monocyclic or polycyclic hydrocarbon ring system by removing a hydrogen atom from a ring carbon atom. The aromatic monocyclic or polycyclic hydrocarbon ring system contains only hydrogen atoms and carbon atoms, where at least one of the rings in the ring system is fully unsaturated (i.e. it contains a cyclic, delocalized [4n+2] π-electron system in accordance with the Hückel theory). The ring system from which aryl groups may be derived include, for example, benzene, indane, indene, tetralin and naphthalene.

The term "carbocyclyl" as used herein refers to a stable non-aromatic monocyclic or polycyclic hydrocarbon radical consisting of carbon and hydrogen atoms, which may include fused or bridged ring systems. The carbocyclyl group is attached to the rest of the molecule by a single bond. The carbocyclyl group may be saturated or unsaturated. A fully saturated carbocyclyl radical may be referred to as a "cycloalkyl" group. Examples of cycloalkyl groups include cyclopropyl, cyclobutyl, cyclopentyl, cyclohexyl, cycloheptyl, and cyclooctyl. An unsaturated carbocyclyl group may be referred to as a "cycloalkenyl" group. Examples of monocyclic cycloalkenyl groups include cyclopentenyl, cyclohexenyl, cycloheptenyl, and cyclooctenyl. Polycyclic carbocyclyl groups include adamantyl, norbornyl (i.e. bicyclo[2.2.1]heptanyl) and norbornenyl groups.

The term "alkoxy" as used herein refers to a radical bonded through an oxygen atom of the formula —O-alkyl, where the alkyl group is defined above. The term "aryloxy" as used herein refers to a radical bonded through an oxygen atom of the formula —O-aryl, where the aryl group is defined above. The term "carbocyclyloxy" as used herein refers to a radical bonded through an oxygen atom of the formula —O-carbocyclyl, where the carbocyclyl group is defined above.

The terms "a" or "an" have an open meaning and when used in relation to a feature allow one or more of that feature to be present. As such, the terms "a" or "an" include "one or more" and "at least one" and can be used interchangeably therewith.

The term "comprises" or "comprising" includes the terms "consisting essentially" or "consisting", and can be used interchangeably therewith.

DETAILED DESCRIPTION OF THE INVENTION

The invention provides a method of promoting growth in a photosynthetic organism, such as in a plant, an algae or a cyanobacteria. The method of promoting growth in photosynthetic organism can be a method for increasing the production of the photosynthetic organism.

Increasing the production of the photosynthetic organism in the context of the invention can be an increase of number, size and/or weight of the photosynthetic organism (e.g. an increase in the number, size and/or weight of a plant or its flowers, seeds and/or fruits) compared to a photosynthetic organism that has not been treated in accordance with the method of the invention.

The method may improve the production of a photosynthetic organism, such as compared to an untreated photosynthetic organism.

The method may produce at least one of the following effects: an increase in the overall yield of the photosynthetic organism; an increase in the number, size and/or weight of the photosynthetic organism; an increase in the number, size and/or weight of a reproductive structure of the photosynthetic organism (e.g. flower of a plant); an increase in the number, size and/or weight of a seed bearing structure (e.g. fruit of a plant) or the seeds of photosynthetic organism.

The method comprises treating the photosynthetic organism with a metal complex or a precursor thereof. For the avoidance of doubt, any reference to treating a photosynthetic organism with a metal complex or precursor thereof includes treating the photosynthetic organism with a formulation in accordance with the fourth aspect of the invention.

Generally, the method comprises treating the photosynthetic organism with an effective amount of the metal complex or the precursor thereof. The effective amount will depend on the type of photosynthetic organism and the environment in which it is produced.

The treatment with a metal complex or a precursor thereof may be repeated, such as repeated over a regular time interval (e.g. daily, weekly or monthly), such as 3 times a week.

The step of treating the photosynthetic organism typically involves contacting the photosynthetic organism with the metal complex or the precursor thereof.

The metal complex or a precursor thereof can be used to generate an increase in the local concentration of carbon dioxide under plant physiological conditions. An increase in carbon dioxide concentration around the active site of rubisco can result in an increase in rubisco photosynthetic activity, which can in turn produce an increase in crop growth.

In comparison to, for example, other approaches for increasing crop growth, the invention does not require the use of genetically modified organisms, such as genetically modified plants. Furthermore, the synthetic metal complexes or ligand precursors thereof are relatively small and are easily characterizable molecules compared to approaches involving the use of biomolecules.

When the photosynthetic organism is treated with the metal complex or a precursor thereof, it is preferred that the photosynthetic organism has not reached maturity (i.e. is fully grown). Thus, the photosynthetic organism may be part grown.

After treating the photosynthetic organism with a metal complex or a precursor thereof, the method may further comprise a step of growing the photosynthetic organism, such as growing the photosynthetic organism to maturity.

The photosynthetic organism can be a natural photosynthetic organism or a transgenic photosynthetic organism.

The photosynthetic organism may be a plant, an algae or a cyanobacteria. It is preferred that the photosynthetic organism is a plant.

The plant may be treated at the seed stage, during germination or during its growth phase. It is preferable to treat the plant during its growth phase.

The plant may be selected from corn, peanut, soybean, a *cucurbita*, a cruciferous vegetable, cotton, beets, rice, sorghum, sugar beet, wheat, barley, rye, sunflower, tomato, sugarcane, tobacco and oats.

Examples of *cucurbita* include squash, pumpkin and gourd. Examples of cruciferous vegetables include horseradish, land cress, Ethiopian mustard, kale, Collard greens, Chinese broccoli, cabbage, savoy cabbage, brussels sprouts, kohlrabi, broccoli, broccoflower, broccoli Romanesco, cauliflower, wild broccoli, bok choy, komatsuna, mizuna, rapini (broccoli rabe), choy sum (flowering cabbage), Chinese cabbage, napa cabbage, turnip root, rutabaga (swede), Siberian kale, canola/rapeseed, wrapped heart mustard cabbage, mustard seeds, white mustard seeds, black mustard seeds, tatsoi, wild arugula, arugula (rocket), field pepperweed, maca, garden cress, watercress, radish, daikon and wasabi.

The plant may be a transgenic plant that confers, for example, tolerance to a particular herbicide or combination of herbicides; increased disease resistance; enhanced tolerance to insects, drought or stress; and/or enhanced yield.

The plant may be a C3 plant, a C4 plant or a CAM plant. It is preferred that the plant or seed of the plant is a C3 plant.

Typically, the C3 plant is selected from the group consisting of tobacco; a cereal (e.g. wheat, rice or barley); beans (e.g. mung bean, kidney bean or pea); a starch-storing plant (e.g. potato, cassava or sweet potato); an oil-storing plant (e.g. soybean, rape, sunflower or cotton plant); a vegetable (e.g. tomato, cucumber, eggplant, carrot, hot pepper, Chinese cabbage, radish, water melon, cucumber, melon, crown daisy, spinach, cabbage or strawberry); a garden plant (e.g. *chrysanthemum*, rose, carnation or *petunia*); *Arabidopsis*; and a tree. It is preferred that the C3 plant is a vegetable.

The algae may be selected from an edible seaweed and a *Chlamydomonas* algae. Edible seaweed may be a red algae, a green algae or a brown algae. Red algae include, for example, carola, carrageen moss, dulse, eucheuma, gelidiella, ogonori, grapestone, hypnea, Irish moss, laver, gim and nori. Green algae include, for example, *chlorella*, gutweed, sea grapes and sea lettuce. Brown algae include, for example, kelp, such as arame, badderlocks, cochayuyo, ecklonia cava, kombu, oarweed, sea palm, sea whip, sugar kelp, wakame and hiromi; fucales, such as bladderwrack, channelled wrack, Hijiki or Hiziki, limu kala, sargassum, spiral wrack, thongweed; and ectocarpales, such as mozuku.

In general, when the photosynthetic organism is a plant or an algae, the step of treating the photosynthetic organism with a metal complex or a precursor thereof may be a step of:
  applying the metal complex or a precursor thereof to the plant or the algae or the surrounding environment; and/or
  treating the plant or the algae with the metal complex or a precursor thereof by fertigation/chemigation (e.g. through an irrigation system); and/or
  coating a seed of the plant with the metal complex or a precursor thereof.

The surrounding environment may be a circle having a radius of no more than 10 cm, preferably no more than 5 cm, with the plant or algae at its centre. For a plant, the metal complex or a precursor thereof may be applied to the soil.

When the photosynthetic organism is a plant, the metal complex or the precursor thereof may be applied to aerial parts of the plant (e.g. leaves) or to the underground parts of the plant (e.g. roots). The metal complex or a precursor thereof may be applied to the soil (e.g. the surrounding environment of the plant), such as by spraying an aqueous solution of the metal complex or a precursor thereof onto the soil. This will allow uptake via the roots of the plant.

It is preferred that the metal complex or a precursor thereof is directly applied to the plant or the algae.

The metal complex or a precursor thereof can be applied to the plant or algae by spraying a solution of the metal complex or a precursor thereof onto the plant or the algae or the surrounding environment of the plant or the algae.

The seed can be coated using a variety of methods known in the art. For example, the step of coating a seed of the plant can comprise (i) spraying a solution of the metal complex or a precursor thereof onto the seed while agitating the seed, such as in a tumbler or a pan granulator, or (ii) dipping or soaking the seed in a solution of the metal complex or a precursor thereof, such as for a period of time to ensure that a sufficient amount of the metal complex or the precursor thereof is absorbed by or coated onto the seed.

Generally, the solution of the metal complex or a precursor thereof is an aqueous solution.

As mentioned above, the metal complex may be formed in situ within the photosynthetic organism or its surrounding environment for uptake into the photosynthetic organism.

The solution of the precursor may comprise a solution of the ligand optionally in combination with a metal salt for preparing the metal complex.

In general, it is preferred that the photosynthetic organism is treated with the metal complex (i.e. not a precursor of the metal complex).

The invention also relates to a metal complex. The metal of the metal complex is preferably a metal ion. The metal ion of the metal complex may have an oxidation state of +1, +2 or +3. It is preferred that the metal ion of the metal complex has an oxidation state of +2. Such an oxidation state is preferred because the carbonic anhydrase family of metalloenzymes generally comprise a metal ion in the +2 oxidation state.

The metal or the metal of the metal ion is selected from the group consisting of zinc (Zn), cobalt (Co), copper (Cu), nickel (Ni) and iron (Fe). More preferably, the metal is selected from the group consisting of zinc (Zn), cobalt (Co) and copper (Cu). It is preferred that the metal is zinc (Zn), more preferably $Zn^{2+}$ (i.e. a zinc ion in the +2 oxidation state).

The metal complex comprises a ligand, which is a bidentate or tridentate ligand. For the avoidance of doubt, the ligand is not a macrocyclic ligand.

Typically, the metal complex has a coordination number (CN) of from 4 to 6. More preferably, the metal complex has a coordination number of 4 or 5. By way of illustration, when the coordination number (CN) is 4 and the ligand is a tridentate ligand, then a second ligand, in addition to the tridentate ligand, will be coordinated to the metal or metal ion. Thus, the metal complex may comprise one or more ligands, in addition to the bidentate or tridentate ligand, within its coordination sphere.

The metal complex may comprise a second ligand. This second ligand may, for example, be a solvent molecule, such as a water. The second ligand is preferably not a bidentate ligand or a tridentate ligand.

In principle, the coordination geometry of the metal complex may be tetrahedral (e.g. CN=4), square planar (e.g. CN=4), trigonal bipyramidal (e.g. CN=5), square pyramidal (e.g. CN=5), octahedral (e.g. CN=6) or trigonal prismatic (e.g. CN=6). It is preferred that the coordination geometry of the metal complex is tetrahedral (e.g. CN=4) or trigonal bipyramidal (e.g. CN=5).

Typically, the ligand has a structure as represented by formula (Ia):

(Ia)

The linker has a chain length of at least 3 atoms between $G_1$ and $G_2$. Typically, the linker has a chain length of 3 to 5 atoms between $G_1$ and $G_2$. Thus, $ring_1$ of $G_1$ and $ring_1$ of $G_2$ is separated by a chain of at least 3 atoms (e.g. 3 to 5 atoms) in length. It is preferred that the linker has a chain length of 3 atoms.

Each of $G_1$ and $G_2$ is a group for coordinating to the metal or metal ion of the metal complex. The linker restricts the coordination geometry (e.g. bite angle) of each of $G_1$ and $G_2$ to the metal. It also provides a steric barrier on one side of the metal, which means that bicarbonate anions ($HCO_3^-$) can only coordinate with the metal when the anions approach the metal from a side that is not blocked by the linker.

In general, the ligand may comprise a water solubilising group and/or a fluorophore group. Each of the water solubilising group and the fluorophore group may independently be bonded to the linker or to a group for coordinating to the metal or metal ion (e.g. $G_1$, $G_2$, or $G_3$).

Some metal complexes may be insoluble in water or aqueous solutions. The inclusion of a water solubilising group as part of the ligand is intended to improve the solubility of the metal complex in comparison to an analogous metal complex without the water solubilising group.

The effect of treating a photosynthetic organism with a metal complex or a precursor thereof can be studied by the inclusion of a fluorophore group or a radio label. Excitation of the fluorophore group can, for example, provide useful experimental information relating to the location and concentration of the metal complex or a precursor thereof within the photosynthetic organism or its surrounding environment.

In general, when the ligand comprises a fluorophore group, then it is preferred that the ligand has a single type (i.e. only one type) of fluorophore group.

Typically, the group(s) for coordinating to the metal or metal ion (e.g. $G_1$, $G_2$ and/or $G_3$) comprise(s) the fluorophore group. It is preferred that each of $G_1$, $G_2$ and $G_3$ comprise(s) the same fluorophore group. The use of the same fluorophore group on $G_1$, $G_2$ and/or $G_3$ can increase the fluorescent signal, which can aid tracking. It is also easier to synthesise symmetrical ligands having the same fluorophore group.

When the ligand comprises a water solubilising group, it is preferred that the group(s) for coordinating to the metal or metal ion (e.g. $G_1$, $G_2$ and/or $G_3$) only comprise(s) the fluorophore group(s). Thus, it is preferred that the linker does not comprise a water solubilising group.

The metal complex has a structure that may be represented by formula (IIIa):

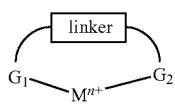
(IIIa)

where M is the metal as defined above and n is 1, 2 or 3, preferably n is 2. Each of $G_1$ and $G_2$ is coordinated to the metal.

When the ligand comprises only two groups for coordinating to the metal, namely $G_1$ and $G_2$, then the ligand is typically a bidentate ligand or it may be a tridentate ligand. The ligand may be a tridentate ligand when the linker comprises a coordinating atom, such as when A in formula (Ic) (see below) is selected from —O—, —S—, and —NE$_1$-.

The ligand may have a structure as represented by formula (Ib):

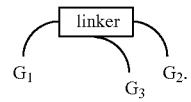
(Ib)

wherein $G_3$ is a group for coordinating to the metal and comprises a heterocyclic group as represented by formula (IIa):

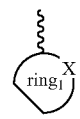
(IIa)

wherein $ring_1$ is directly bonded to the linker; and X is a heteroatom selected from the group consisting of nitrogen, sulfur and oxygen. With reference to "X", the term "$X_3$" may be used herein to denote the individual identity of the moiety at position "X" for $G_3$ (i.e. to differentiate from the "X" position in $G_1$ and $G_2$).

In addition to the linker having a chain length of at least 3 atoms (e.g. 3 to 5 atoms) between $G_1$ and $G_2$, then preferably the linker has a chain length of at least 3 atoms between $G_1$ and $G_3$, such as 3 to 5 atoms between $G_1$ and $G_3$. More preferably, the linker has a chain length of at least 3 atoms between $G_1$ and $G_3$ and a chain length of at least 3 atoms between $G_2$ and $G_3$, such as 3 to 5 atoms between $G_1$ and $G_3$ and 3 to 5 atoms between $G_2$ and $G_3$. Even more preferably, the linker has a chain length of 3 atoms between each of $G_1$ and $G_2$, $G_1$ and $G_3$, and $G_2$ and $G_3$.

When the ligand has a structure represented by formula (Ib), then the metal complex has a structure that may be represented by formula (IIIb):

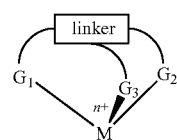
(IIIb)

where M is the metal as defined above and n is 1, 2 or 3, preferably n is 2. Each of $G_1$, $G_2$ and $G_3$ is coordinated to the metal.

When the ligand comprises only three groups for coordinating to the metal, namely $G_1$, $G_2$ and $G_3$, then the ligand is typically a tridentate ligand or it may be a tetradentate ligand (e.g. the ligand is a tripodal ligand). The ligand may be a tetradentate ligand when the linker comprises a coordinating atom, such as when A in formula (Ic) below is selected from —O—, —S—, and —NE$_1$-.

It is preferred that the ligand is at least a tridentate ligand. More preferably, it is preferred that the ligand comprises at least three groups for coordinating to the metal, which are $G_1$, $G_2$ and $G_3$. It has been found that metal complexes having at least a tridentate ligand, particularly when the ligand has coordinating groups $G_1$, $G_2$ and $G_3$, show better activity in promoting the growth of a photosynthetic organism than analogous metal complexes having a bidentate ligand with only two coordinating groups $G_1$ and $G_2$.

In general, the ligand may have a structure as represented by formula (Ic):

wherein:

A is selected from —O—, —S—, —($CE_1H$)— and —$NE_1$-;

$E_1$ is selected from —H, —($CR_5R_6$)-$G_3$, optionally substituted $C_1$ to $C_6$ alkyl, a water solubilising group and a fluorophore group;

each of $R_1$, $R_2$, $R_3$, $R_4$, $R_5$ and $R_6$ is independently selected from —H, optionally substituted $C_1$ to $C_6$ alkyl, a water solubilising group and a fluorophore group.

In formula (Ic) the linker is represented by the moiety —($CR_1R_2$)-A-($CR_3R_4$)—, which has a chain length of 3 atoms between $G_1$ and $G_2$. When A is either —($CE_1H$)— or —$NE_1$- and $E_1$ is —($CR_5R_6$)-$G_3$, then the linker has a chain length of 3 atoms between $G_1$ and $G_2$, a chain length of 3 atoms between $G_1$ and $G_3$ and a chain length of 3 atoms between $G_2$ and $G_3$.

When A is —O— or —S— or when A is either —($CE_1H$)— or —$NE_1$- and $E_1$ is —H (i.e. a hydrogen atom), then the ligand comprises only $G_1$ and $G_2$ as the groups for coordinating to the metal. The ligand is at least a bidentate ligand. The ligand may be a tridentate ligand. For example, the ligand may be a tridentate ligand if a lone pair from the —O—, —S— or —N— in the linker is able to coordinate with the metal. This will depend on the identity of the metal and the overall structure of the ligand.

When A is either —($CE_1H$)— or —$NE_1$- and $E_1$ is —($CR_5R_6$)-$G_3$, then the ligand comprises only $G_1$, $G_2$ and $G_3$ as the groups for coordinating to the metal. The ligand is at least a tridentate ligand. The ligand may be a tetradentate ligand. For example, the ligand may be a tetradentate ligand if a lone pair from the —N— in the linker is able to coordinate with the metal.

When $E_1$, $R_1$, $R_2$, $R_3$, $R_4$, $R_5$ or $R_6$ is optionally substituted $C_1$ to $C_6$ alkyl, then the $C_1$ to $C_6$ alkyl may optionally be substituted with a group selected from $C_2$ to $C_6$ alkenyl, $C_2$ to $C_6$ alkynyl, halo, fluoro-($C_1$ to $C_6$ alkyl), cyano, nitro, $C_6$ to $C_{10}$ aryl, $C_3$ to $C_8$ carbocyclyl, $C_1$ to $C_6$ alkoxy, $C_6$ to $C_{10}$ aryloxy, $C_3$ to $C_8$ carbocyclyloxy, a water solubilising group and a fluorophore group.

$R_1$ and $R_3$ is preferably each —H. More preferably, $R_1$, $R_2$, $R_3$ and $R_4$ is each —H. Even more preferably, $R_1$, $R_2$, $R_3$, $R_4$, $R_5$ and $R_6$ is each —H.

In general, it is preferred that A is —$NE_1$-. The ligand may then be represented by formula (Id) or formula (Ie):

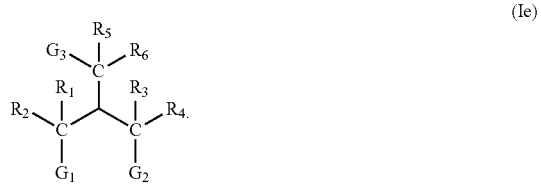

In formula (Ic) or (Ie), $R_5$ is preferably —H. Thus, when the ligand has a structure represented by formula (Ic) or (Ie), then preferably $R_1$, $R_3$ and $R_5$ is each —H.

When the ligand has a structure represented by formula (Ic) or (Ie), then preferably $R_5$ and $R_6$ is each —H. More preferably, $R_1$, $R_2$, $R_3$, $R_4$, $R_5$ and $R_6$ is each —H.

In general, the ligand preferably has a structure represented by formula (Ie).

The ligand comprises at least two groups for coordinating to the metal, which are represented by $G_1$ and $G_2$. The ligand may comprise only two groups for coordinating to the metal (e.g. $G_1$ and $G_2$).

As a general feature of the ligand (i.e. see formulae (Ia), (Ib), (Ic), (Id), (Ie), (IIIa) or (IIIb) above), each of $G_1$ and $G_2$ independently comprises a heterocyclic group as represented by formula (IIa):

wherein $ring_1$ is directly bonded to the linker, and X is a heteroatom selected from nitrogen, sulfur and oxygen. The wavy line attached to $ring_1$ denotes the point of attachment of $G_1$ or $G_2$ to the linker. $Ring_1$ is not directly bonded to the linker at X. The heteroatom (represented by X) has a lone pair of electrons for coordinating to the metal.

$G_1$ and $G_2$ may be the same or different. For each of $G_1$ and $G_2$, it is preferred that $ring_1$ has 5 ring atoms.

$G_1$ and $G_2$ may each independently be optionally substituted by one or more substituents selected from $C_1$ to $C_6$ alkyl, $C_2$ to $C_6$ alkenyl, $C_2$ to $C_6$ alkynyl, halo, fluoro-($C_1$ to $C_6$ alkyl), cyano, nitro, $C_6$ to $C_{10}$ aryl, $C_3$ to $C_8$ carbocyclyl, $C_1$ to $C_6$ alkoxy, $C_6$ to $C_{10}$ aryloxy, $C_3$ to $C_8$ carbocyclyloxy, a water solubilising group and a fluorophore group.

In alpha-carbonic anhydrase, the metal ion is coordinated to the nitrogen atoms of 3 separate imidazolyl groups, each of which is from a histidine amino acid. In beta-carbonic anhydrase, the metal ion is coordinated to one nitrogen atom from the imidazolyl group of histidine and two sulfur atoms, each of which is from a cysteine amino acid.

In principle, $G_1$ and $G_2$ may each independently comprise a heterocyclic group having two or more fused rings, which includes $ring_1$ and $ring_2$, as represented in formula (IIb) (see below). Each heterocyclic group may comprise at least three fused rings, such as where $ring_1$ is fused to $ring_2$ (as shown in formula (IIb)), and where $ring_2$ is fused to a $ring_3$ (not shown in formula (IIb)). $Ring_3$ is preferably not fused to $ring_1$.

Generally, it is preferred that $G_1$ and $G_2$ each independently comprise a heterocyclic group having only two fused rings (i.e. $ring_1$ and $ring_2$ as shown in formula (IIb)).

It is preferred that each of $G_1$ and $G_2$ independently comprises a heterocyclic group having fused bicyclic rings as represented by formula (IIb):

wherein ring₁ is directly bonded to the linker, and X is a heteroatom selected from nitrogen, sulfur and oxygen. More preferably, both $G_1$ and $G_2$ independently comprise a heterocyclic group having only two fused bicyclic rings as represented by formula (IIb) above.

The fused bicyclic ring system provides steric bulk around the active site (i.e. the metal or metal ion) of the metal complex. The rings influence the shape and size of the active site within the metal complex.

For each of $G_1$ and $G_2$, ring₁ and/or ring₂ may be optionally substituted. It is preferred that ring₂ is optionally substituted. Ring₁ may be unsubstituted.

Each of $G_1$ and $G_2$ is typically an optionally substituted heterocyclic group having 9 or 10 ring atoms.

Typically, ring₂ has 6 ring atoms. When the heterocyclic group has 9 or 10 ring atoms, then ring₁ has 5 or 6 atoms (e.g. ring₁ and ring₂ share 2 ring atoms). It is preferred that ring₂ is aromatic.

$G_1$ and $G_2$ may each independently be an optionally substituted heterocyclic group as represented by formula (IIc):

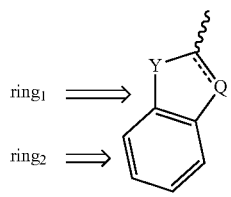

(IIc)

wherein Y is selected from —CH₂—, —NH—, —S— and —O—; Q is selected from —CH₂—, —CH—, —NH—, —N—, —S— and —O—; and at least one of Y and Q is a heteroatom (e.g. Y is not —CH₂— when Q is —CH₂— or —CH—). When Q is —CH— or —N—, then there is a double bond at the position represented by the dashed line (e.g. see formula (IIc1) below). When Q is —CH₂—, —NH—, —S— or —O—, then there is a single bond at the position represented by the dashed line (e.g. see formula (IIc2) below).

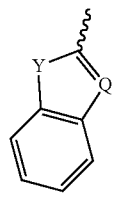

(IIc1)

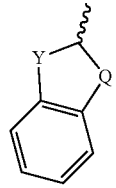

(IIc2)

The wavy line in formulae (IIc), (IIc1) and (IIc2) attached to ring₁ denotes the point of attachment of $G_1$ or $G_2$ to the linker in formulae (Ia), (Ib), (Ic), (Id), (Ie), (IIIa) or (IIIb) above. The labels "ring₁" and "ring₂" in formula (IIc) above are included for illustrative purposes. With reference to "Y", the terms "$Y_1$" and "$Y_2$" may be used herein to denote the individual identity of the moiety at position "Y" for $G_1$ and $G_2$ respectively. Similarly, with reference to "Q", the terms "$Q_1$" and "$Q_2$" may be used herein to denote the individual identity of the moiety at position "Q" for $G_1$ and $G_2$ respectively.

It is preferred that Y is selected from —NH— and —S—; and Q is selected from —NH, —N—, and —S—, particularly —N— and —S—.

Each of $G_1$ and $G_2$ may be independently selected from a heterocyclic group shown in Table 1, which is optionally substituted, such as described above.

$G_1$ may be an optionally substituted heterocyclic group, wherein the heterocyclic group is:
  (a) selected from benzofuranyl, benzothiophenyl, indolyl, benzoxazolyl, benzothiazolyl, benzimidazolyl, 1H-pyrrolo[3,2-b]pyridinyl, 1H-pyrrolo[3,2-c]pyridinyl, pyrrolo[2,3-c]pyridinyl, pyrrolo[2,3-b]pyridinyl, 7H-pyrrolo[2,3-d]pyrimidinyl, 5H-pyrrolo[3,2-d]pyrimidinyl, 7H-purinyl, imidazo[4,5-b]pyridinyl, pyrazolo[1,5-a]pyridinyl, imidazo[1,2-a]pyrazinyl and imidazo[1,2-a]pyrimidinyl, preferably wherein the heterocyclic group is directly bonded to the linker at the 2-position; or
  (b) selected from indazolyl, [1,2,3]triazolo[4,5-b]pyridiny, imidazo[1,2-c]pyrimidinyl, imidazo[1,5-a]pyridinyl, [1,2,4]triazolo[4,3-a]pyridinyl and [1,2,3]triazolo[1,5-a]pyridinyl, preferably wherein the heterocyclic group is directly bonded to the linker at the 3-position.

It is preferred that $G_1$ is an optionally substituted heterocyclic group, wherein the heterocyclic group is selected from benzofuranyl, benzothiophenyl, indolyl, benzoxazolyl, benzothiazolyl and benzimidazolyl, such as 2-benzofuranyl, 2-benzothiophenyl, 2-indolyl, 2-benzoxazolyl, 2-benzothiazolyl or 2-benzimidazolyl. More preferably, the heterocyclic group is selected from benzoxazolyl, benzothiazolyl and benzimidazolyl, particularly 2-benzoxazolyl, 2-benzothiazolyl or 2-benzimidazolyl. Even more preferably, the heterocyclic group is 2-benzothiazolyl or 2-benzimidazolyl. The heterocyclic group may be 2-benzothiazolyl. The heterocyclic group may be 2-benzimidazolyl.

Typically, $G_2$ is an optionally substituted heterocyclic group, wherein the heterocyclic group is:
  (a) selected from benzofuranyl, benzothiophenyl, indolyl, benzoxazolyl, benzothiazolyl, benzimidazolyl, 1H-pyrrolo[3,2-b]pyridinyl, 1H-pyrrolo[3,2-c]pyridinyl, pyrrolo[2,3-c]pyridinyl, pyrrolo[2,3-b]pyridinyl, 7H-pyrrolo[2,3-d]pyrimidinyl, 5H-pyrrolo[3,2-d]pyrimidinyl, 7H-purinyl, imidazo[4,5-b]pyridinyl, pyrazolo[1,5-a]pyridinyl, imidazo[1,2-a]pyrazinyl and imidazo[1,2-a]pyrimidinyl, preferably wherein the heterocyclic group is directly bonded to the linker at the 2-position; or
  (b) selected from indazolyl, [1,2,3]triazolo[4,5-b]pyridiny, imidazo[1,2-c]pyrimidinyl, imidazo[1,5-a]pyridinyl, [1,2,4]triazolo[4,3-a]pyridinyl and [1,2,3]triazolo[1,5-a]pyridinyl, preferably wherein the heterocyclic group is directly bonded to the linker at the 3-position.

TABLE 1

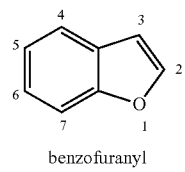

benzofuranyl

TABLE 1-continued
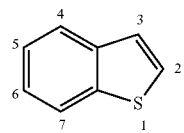
benzothiophenyl
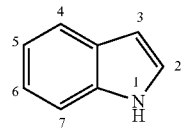
indolyl
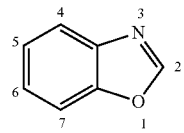
benzoxazolyl
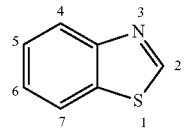
benzothiazolyl
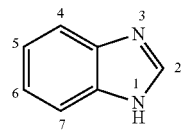
benzimidazolyl
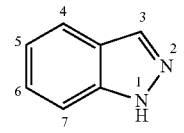
indazolyl
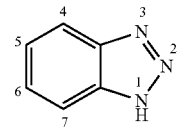
benzotriazolyl
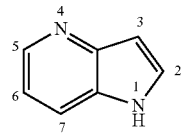
1H-pyrrolo[3,2-b]pyridinyl
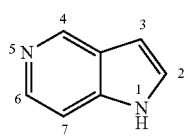
1H-pyrrolo[3,2-c]pyridinyl
TABLE 1-continued
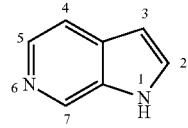
pyrrolo[2,3-c]pyridinyl
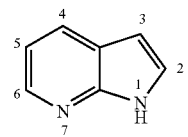
pyrrolo[2,3-b]pyridinyl
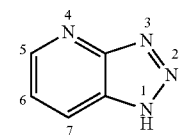
[1,2,3]triazolo[4,5-b]pyridinyl
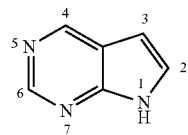
7H-pyrrolo[2,3-d]pyrimidinyl
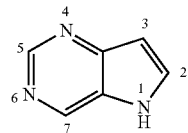
5H-pyrrolo[3,2-d]pyrimidinyl
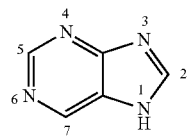
7H-purinyl
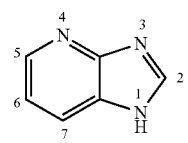
imidazo[4,5-b]pyridinyl
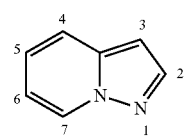
pyrazolo[1,5-a]pyridinyl TABLE 1-continued

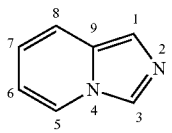

imidazo[1,5-a]pyridinyl

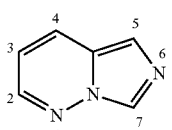

imidazo[1,5-b]pyridazinyl

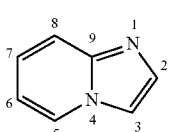

imidazo[1,2-a]pyridinyl

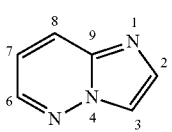

imidazo[1,2-b]pyridazinyl

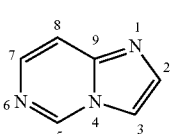

imidazo[1,2-c]pyrimidinyl

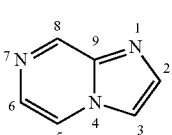

imidazo[1,2-a]pyrazinyl

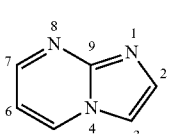

imidazo[1,2-a]pyrimidinyl

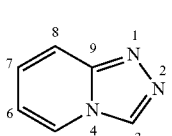

[1,2,4]triazolo[4,3-a]pyridinyl

TABLE 1-continued

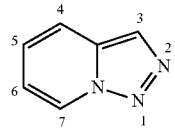

[1,2,3]triazolo[1,5-a]pyridinyl

It is preferred that $G_2$ is an optionally substituted heterocyclic group, wherein the heterocyclic group is selected from benzofuranyl, benzothiophenyl, indolyl, benzoxazolyl, benzothiazolyl and benzimidazolyl, such as 2-benzofuranyl, 2-benzothiophenyl, 2-indolyl, 2-benzoxazolyl, 2-benzothiazolyl or 2-benzimidazolyl. More preferably, the heterocyclic group is selected from benzoxazolyl, benzothiazolyl and benzimidazolyl, particularly 2-benzoxazolyl, 2-benzothiazolyl or 2-benzimidazolyl. Even more preferably, the heterocyclic group is 2-benzothiazolyl or 2-benzimidazolyl. The heterocyclic group may be 2-benzothiazolyl. The heterocyclic group may be 2-benzimidazolyl.

More preferably, $G_1$ and $G_2$ is each independently an optionally substituted heterocyclic group as represented by formula (IId):

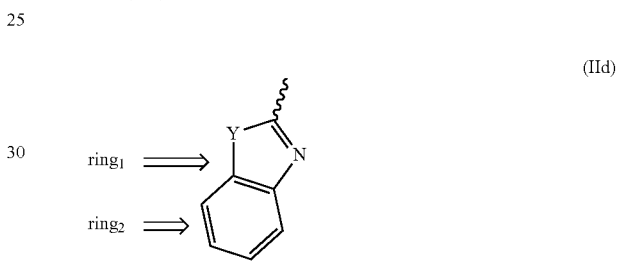

(IId)

wherein Y is selected from —CH$_2$—, —NH—, —S— and —O—. The wavy line attached to ring$_1$ denotes the point of attachment of $G_1$ or $G_2$ to the linker in formulae (Ia), (Ib), (Ic), (Id), (Ie), (IIIa) or (IIIb) above. The labels "ring$_1$" and "ring$_2$" are included for illustrative purposes. With reference to "Y", the terms "Y$_1$" and "Y$_2$" may be used herein to denote the individual identity of the moiety at position "Y" for $G_1$ and $G_2$ respectively.

Each heterocyclic group (for $G_1$ or $G_2$) may be unsubstituted or substituted by one or more substituents selected from $C_1$ to $C_6$ alkyl, $C_2$ to $C_6$ alkenyl, $C_2$ to $C_6$ alkynyl, halo, fluoro-($C_1$ to $C_6$ alkyl), cyano, nitro, $C_6$ to $C_{10}$ aryl, $C_3$ to $C_8$ carbocyclyl, $C_1$ to $C_6$ alkoxy, $C_6$ to $C_{10}$ aryloxy, $C_3$ to $C_8$ carbocyclyloxy, a water solubilising group and a fluorophore group. For the avoidance of doubt, the optional substituent may be attached to the heterocyclic group at the Y position.

The ligand may preferably have a structure represented by formula (If):

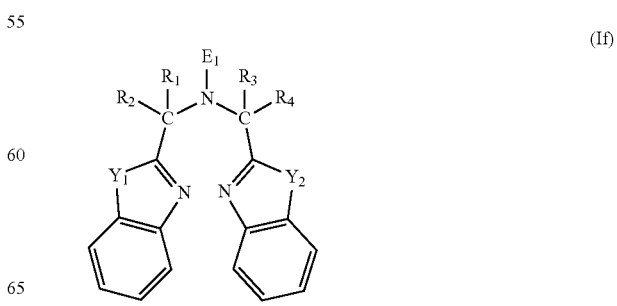

(If)

wherein:
Y$_1$ is selected from —CH$_2$—, —NH—, —S— and —O—;
Y$_2$ is selected from —CH$_2$—, —NH—, —S— and —O—;
E$_1$ is selected from —H, —(CR$_5$R$_6$)-G$_3$, optionally substituted C$_1$ to C$_6$ alkyl, a water solubilising group and a fluorophore group, such as described above; and
each of R$_1$, R$_2$, R$_3$, R$_4$, R$_5$ and R$_6$ is as defined above.

It is preferred that Y$_1$ is selected from —NH— and —S—. More preferably, Y$_1$ is —S—.

Y$_2$ is preferably selected from —NH— and —S—. More preferably, Y$_2$ is —S—.

In one embodiment, E$_1$ is —H; Y$_1$ is —S— and Y$_2$ is —S—. In another embodiment, E$_1$ is —H; Y$_1$ is —NH— and Y$_2$ is —NH—.

In general, the ligand may comprise three groups for coordinating to the metal, namely G$_1$, G$_2$ and G$_3$. The ligand preferably comprises only three groups for coordinating to the metal (e.g. G$_1$, G$_2$ and G$_3$).

As a general feature of the ligand (i.e. see formulae (Ia), (Ib), (Ic), (Id), (Ie), (If), (IIIa) or (IIIb) above), G$_3$ comprises a heterocyclic group as represented by formula (IIa):

(IIa)

wherein ring$_1$ is directly bonded to the linker, and X is a heteroatom selected from nitrogen, sulfur and oxygen. The wavy line attached to ring$_1$ denotes the point of attachment of G$_3$ to the linker. Ring$_1$ is not directly bonded to the linker at X. The heteroatom (represented by X) has a lone pair of electrons for coordinating to the metal.

G$_1$ and G$_3$ may be the same or different. G$_1$ and G$_2$ may be the same or different.

For G$_3$, it is preferred that ring$_1$ has 5 ring atoms.

G$_3$ may be optionally substituted by one or more substituents selected from C$_1$ to C$_6$ alkyl, C$_2$ to C$_6$ alkenyl, C$_2$ to C$_6$ alkynyl, halo, fluoro-(C$_1$ to C$_6$ alkyl), cyano, nitro, C$_6$ to C$_{10}$ aryl, C$_3$ to C$_8$ carbocyclyl, C$_1$ to C$_6$ alkoxy, C$_6$ to C$_{10}$ aryloxy, C$_3$ to C$_8$ carbocycloxy, a water solubilising group and a fluorophore group.

In principle, G$_3$ may comprise a heterocyclic group having two or more fused rings, which includes ring$_1$ and ring$_2$, as represented in formula (IIb) (see below). The heterocyclic group may comprise at least three fused rings, such as where ring$_1$ is fused to ring$_2$ (as shown in formula (IIb)), and where ring$_2$ is fused to a ring$_3$ (not shown in formula (IIb)). Ring$_3$ is preferably not fused to ring$_1$.

Generally, it is preferred that G$_3$ comprises a heterocyclic group having only two fused rings (i.e. ring$_1$ and ring$_2$ as shown in formula (IIb)).

It is preferred that G$_3$ comprises a heterocyclic group having fused bicyclic rings as represented by formula (IIb):

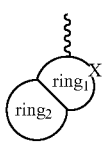

(IIb)

wherein ring$_1$ is directly bonded to the linker, and X is a heteroatom selected from nitrogen, sulfur and oxygen. More preferably, G$_3$ comprises a heterocyclic group having only two fused bicyclic rings as represented by formula (IIb) above.

For G$_3$, ring$_1$ and/or ring$_2$ may be optionally substituted. It is preferred that ring$_2$ is optionally substituted. Ring$_1$ may be unsubstituted.

G$_3$ is typically an optionally substituted heterocyclic group having 9 or 10 ring atoms.

Typically, ring$_2$ has 6 ring atoms. When the heterocyclic group has 9 or 10 ring atoms, then ring$_1$ has 5 or 6 atoms (e.g. ring$_1$ and ring$_2$ share 2 ring atoms). It is preferred that ring$_2$ is aromatic.

G$_3$ may be an optionally substituted heterocyclic group as represented by formula (IIc):

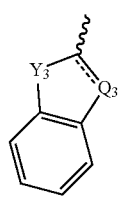

(IIc)

wherein Y$_3$ is selected from —CH$_2$—, —NH—, —S— and —O—; Q$_3$ is selected from —CH$_2$—, —CH—, —NH—, —N—, —S— and —O—; and at least one of Y$_3$ and Q$_3$ is a heteroatom (e.g. Y$_3$ is not —CH$_2$—when Q$_3$ is —CH$_2$— or —CH—). When Q$_3$ is —CH— or —N—, then there is a double bond at the position represented by the dashed line. When Q$_3$ is —CH$_2$—, —NH—, —S— or —O—, then there is a single bond at the position represented by the dashed line.

The wavy line in formula (IIc) attached to ring$_1$ denotes the point of attachment of G$_3$ to the linker in formulae (Ia), (Ib), (Ic), (Id), (Ie), (IIIa) or (IIIb) above.

It is preferred that Y$_3$ is selected from —NH— and —S—; and Q$_3$ is selected from —NH, —N—, and —S—, particularly —N—, and —S—.

G$_3$ may be selected from a heterocyclic group shown in Table 1, which is optionally substituted, such as described above.

Typically, G$_3$ is an optionally substituted heterocyclic group, wherein the heterocyclic group is selected from:
(a) benzofuranyl, benzothiophenyl, indolyl, benzoxazolyl, benzothiazolyl, benzimidazolyl, 1H-pyrrolo[3,2-b]pyridinyl, 1H-pyrrolo[3,2-c]pyridinyl, pyrrolo[2,3-c]pyridinyl, pyrrolo[2,3-b]pyridinyl, 7H-pyrrolo[2,3-d]pyrimidinyl, 5H-pyrrolo[3,2-d]pyrimidinyl, 7H-purinyl, imidazo[4,5-b]pyridinyl, pyrazolo[1,5-a]pyridinyl, imidazo[1,2-a]pyrazinyl and imidazo[1,2-a]pyrimidinyl, preferably wherein the heterocyclic group is directly bonded to the linker at the 2-position; or
(b) indazolyl, [1,2,3]triazolo[4,5-b]pyridiny, imidazo[1,2-c]pyrimidinyl, imidazo[1,5-a]pyridinyl, [1,2,4]triazolo[4,3-a]pyridinyl and [1,2,3]triazolo[1,5-a]pyridinyl, preferably wherein the heterocyclic group is directly bonded to the linker at the 3-position.

It is preferred that G$_3$ is an optionally substituted heterocyclic group, wherein the heterocyclic group is selected from benzofuranyl, benzothiophenyl, indolyl, benzoxazolyl, benzothiazolyl and benzimidazolyl, such as 2-benzofuranyl, 2-benzothiophenyl, 2-indolyl, 2-benzoxazolyl, 2-benzothiazolyl or 2-benzimidazolyl. More preferably, the heterocyclic group is selected from benzoxazolyl, benzothiazolyl and benzimidazolyl, particularly 2-benzoxazolyl, 2-benzothiazolyl or 2-benzimidazolyl. Even more preferably, the heterocyclic group is 2-benzothiazolyl or 2-benzimidazolyl. The heterocyclic group may be 2-benzothiazolyl. The heterocyclic group may be 2-benzimidazolyl.

More preferably, $G_3$ is an optionally substituted heterocyclic group as represented by formula (IId):

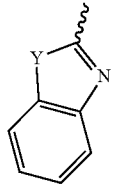

(IId)

wherein Y is selected from —$CH_2$—, —NH—, —S— and —O—. The wavy line denotes the point of attachment of $G_3$ to the linker in formulae (Ia), (Ib), (Ic), (Id), (Ie), (If), (IIIa) or (IIIb) above. With reference to "Y", the term "$Y_3$" may be used herein to denote the individual identity of the moiety at position "Y" for $G_3$ (i.e. to differentiate from the "Y" position in $G_1$ and $G_2$).

The heterocyclic group for $G_3$ may be unsubstituted or substituted by one or more substituents selected from $C_1$ to $C_6$ alkyl, $C_2$ to $C_6$ alkenyl, $C_2$ to $C_6$ alkynyl, halo, fluoro-($C_1$ to $C_6$ alkyl), cyano, nitro, $C_6$ to $C_{10}$ aryl, $C_3$ to $C_8$ carbocyclyl, $C_1$ to $C_6$ alkoxy, $C_6$ to $C_{10}$ aryloxy, $C_3$ to $C_8$ carbocyclyloxy, a water solubilising group and a fluorophore group. For the avoidance of doubt, the optional substituent may be attached to the heterocyclic group at the Y position.

The ligand may preferably have a structure represented by formula (If2):

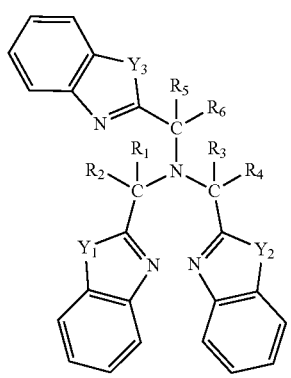

(If2)

wherein:
$Y_1$ is selected from —$CH_2$—, —NH—, —S— and —O—;
$Y_2$ is selected from —$CH_2$—, —NH—, —S— and —O—;
$Y_3$ is selected from —$CH_2$—, —NH—, —S— and —O—; and
each of $R_1$, $R_2$, $R_3$, $R_4$, $R_5$ and $R_6$ is as defined above.
It is preferred that $Y_1$ is selected from —NH— and —S—.
$Y_2$ is preferably selected from —NH— and —S—.
$Y_3$ is preferably selected from —NH— and —S—.

In one embodiment, $Y_1$ is —S—; $Y_2$ is —NH— and $Y_3$ is —NH— or —S—, preferably $Y_3$ is —S—. In another embodiment, all of $Y_1$, $Y_2$ and $Y_3$ are —S— or —NH—, preferably —S—.

The metal complex may be:
- a zinc complex of tris(2-benzimidazolylmethyl)amine ["Zn3N"];
- a zinc complex of tris(2-benzothiazolylmethyl)amine ["Zn3S"];
- a zinc complex of bis(2-benzimidazolylmethyl)amine ["Zn2N"];
- a zinc complex of bis(2-benzothiazolylmethyl)amine ["Zn2S"];
- a zinc complex of bis(2-benzimidazolylmethyl)(2-benzothiazolylmethyl)amine ["Zn2N1S"]; or
- a zinc complex of bis(2-benzothiazolylmethyl)(2-benzimidazolylmethyl)amine ["Zn1N2S"].

Figure 2:
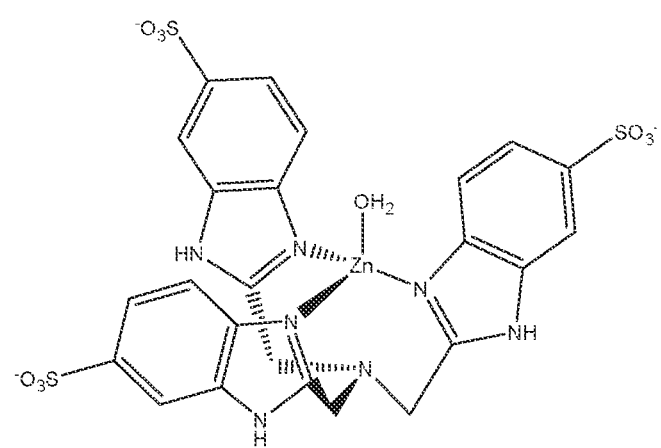
FIG. 2 shows a zinc complex of nitrilotris(2-benzimidazolylmethyl-6-sulfonate), as described by K. Nakata et al. (*J. Inorg. Biochem.*, 89 (2002), 255-266).

It is preferable, particularly for the second to fourth aspects of the invention, that the metal complex is not:
- a zinc complex of tris(2-benzimidazolylmethyl)amine (see FIG. 1);
- a zinc complex of nitrilotris(2-benzimidazolylmethyl-6-sulfonate) (see FIG. 2);
- a zinc complex of either nitrilotris(2-benzimidazolylmethyl-6-sulfonic acid) or a conjugate base thereof;
- a copper complex of tris(2-benzimidazolylmethyl)amine ["3N Ligand" or "(BimH)$_3$"];
- a copper complex of tris(2-benzothiazolylmethyl)amine ["3S Ligand" or "(Bth)$_3$"];
- a copper complex of bis(2-benzimidazolylmethyl)amine ["2N Ligand" or "H(BimH)$_2$"];
- a copper complex of bis(2-benzothiazolylmethyl)amine ["2S Ligand" or "H(Bth)$_2$"];
- a copper complex of bis(2-benzimidazolylmethyl)(2-benzothiazolylmethyl)amine ["2N1S Ligand" or "(Bth)(BimH)$_2$"];
- a copper complex of bis(2-benzothiazolylmethyl)(2-benzimidazolylmethyl)amine ["1N2S Ligand" or "(Bth)$_2$(BimH)"];
- a copper complex of nitrilotris(2-benzimidazolylmethyl-6-sulfonic acid) ["(BimH/S)$_3$"] or a conjugate base thereof;
- a copper complex of nitrilotris(2-benzimidazolylmethyl-5-sulfonic acid) or a conjugate base thereof;
- a copper complex of tris((5,6-dimethyl-1H-benzimidazol-2-yl)methyl)amine ["(BimH/Me$_2$)$_3$"];
- a copper complex of tris(1-methyl-2-benzimidazolylmethyl)amine ["(BimC$_1$H)$_3$"];
- a copper complex of tris(1-propyl-2-benzimidazolylmethyl)amine ["(BimC$_3$H)$_3$"];
- a copper complex of either triethyl 2,2',2"-(2,2',2"-nitrilotris(methylene)tris(1H-benzimidazole-2,1-diyl))triethanoate ["(BimC$_1$E)$_3$"] or a carboxylic acid thereof or a conjugate base of the carboxylic acid thereof ["(BimC$_1$A)$_3$"], such as the potassium salt;
- a copper complex of either tri-tert-butyl 2,2',2"-(2,2',2"-nitrilotris(methylene)tris(1H-benzimidazole-2,1-diyl)) triethanoate ["(BimC$_1$E')$_3$"] or a carboxylic acid thereof or a conjugate base of the carboxylic acid thereof ["(BimC$_1$A)$_3$"], such as the potassium salt;
- a copper complex of either triethyl 4,4',4"-(2,2',2"-nitrilotris(methylene)tris(1H-benzimidazole-2,1-diyl))tributanoate ["BimC$_3$E)$_3$"] or a carboxylic acid thereof or a conjugate base of the carboxylic acid thereof ["(BimC$_3$A)$_3$"], such as the potassium salt thereof;

a copper complex of either 5,5',5"-(2,2',2"-nitrilotris (methylene)tris(1H-benzimidazole-2,1-diyl))tributanoate or a conjugate acid thereof;

a copper complex of either ethyl 5-(2-((bis((1H-benzimidazol-2-yl)methyl)amino)methyl)-1H-benzo[d]imidazol-1-yl)pentanoate ["BimH)$_2$(BimC$_4$E)"] or a carboxylic acid thereof or a conjugate base of the carboxylic acid thereof ["BimH)$_2$(BimC$_4$A)"], such as the potassium salt thereof;

a copper complex of either diethyl 5,5'-(2,2'-(benzo[d] thiazol-2-ylmethylazanediyl)bis(methylene)bis(1H-benzo[d]imidazole-2,1-diyl))dipentanoate ["(Bth)(BimC$_4$E)$_2$"] or a carboxylic acid thereof or a conjugate base of the carboxylic acid thereof ["(Bth)(Bim C$_4$A)$_2$"], such as the potassium salt thereof;

a copper complex of either triethyl 5,5',5"-(2,2',2"-nitrilotris(methylene)tris(1H-benzimidazole-2,1-diyl))tripentanoate ["(BimC$_4$E)$_3$"] or the carboxylic acid thereof or a conjugate base of the carboxylic acid thereof ["(BimC$_4$A)$_3$"], such as the potassium salt;

a copper complex of either triethyl 5,5',5"-(2,2',2"-nitrilotris(methylene)tris(5,6-dimethyl-1H-benzimidazole-2, 1-diyl))tripentanoate ["(BimC$_4$E/Me$_2$)$_3$"] or the carboxylic acid thereof or a conjugate base of the carboxylic acid thereof ["(BimC$_4$A/Me$_2$)$_3$"], such as the potassium salt;

a copper complex of either diethyl 6,6'-(2,2'-((1H-benzo [d]imidazol-2-yl)methylazanediyl)bis(methylene)-bis (1H-benzimidazole-2,1-diyl))dihexanoate ["(BimH)(BimC$_5$E)$_2$"] or the carboxylic acid thereof or a conjugate base of the carboxylic acid thereof ["(BimH)(BimC$_5$A)$_2$"], such as the potassium salt;

a copper complex of either triethyl 6,6',6"-(2,2',2"-nitrilotris(methylene)tris(1H-benzimidazole-2,1-diyl))trihexanoate ["(BimC$_5$E)$_3$"] or the carboxylic acid thereof or a conjugate base of the carboxylic acid thereof ["(BimC$_5$A)$_3$"], such as the potassium salt;

a copper complex of tris((1-benzyl-1H-1,2,3-triazol-4-yl) methyl)amine [TBTA]; or a copper complex of tris(2-pyridylmethyl)amine ["(Py)$_3$"].

It may be preferable, particularly in the second, third or fourth aspects of the invention, that the metal complex is not a zinc complex of tris(2-benzimidazolylmethyl)amine.

It is preferable, particularly for the fifth aspect of the invention, that the ligand is not:

tris(2-benzimidazolylmethyl)amine ["3N Ligand" or "(BimH)$_3$"];

tris(2-benzothiazolylmethyl)amine ["3S Ligand" or "(Bth)$_3$"];

bis(2-benzimidazolylmethyl)amine ["2N Ligand" or "H(BimH)$_2$"];

bis(2-benzothiazolylmethyl)amine ["2S Ligand" or "H(Bth)$_2$"];

bis(2-benzimidazolylmethyl)(2-benzothiazolylmethyl) amine ["2N1S Ligand" or "(Bth)(BimH)$_2$"];

bis(2-benzothiazolylmethyl)(2-benzimidazolylmethyl) amine ["1N2S Ligand" or "(Bth)$_2$(BimH)"];

nitrilotris(2-benzimidazolylmethyl-6-sulfonic acid) ["(BimH/S)$_3$"] or a conjugate base thereof;

nitrilotris(2-benzimidazolylmethyl-5-sulfonic acid) or a conjugate base thereof;

tris((5,6-dimethyl-1H-benzimidazol-2-yl)methyl)amine ["(BimH/Me$_2$)$_3$"];

tris(1-methyl-2-benzimidazolylmethyl)amine ["(BimC$_1$H)$_3$"];

tris(1-propyl-2-benzimidazolylmethyl)amine ["(BimC$_3$H)$_3$"];

triethyl 2,2',2"-(2,2',2"-nitrilotris(methylene)tris(1H-benzimidazole-2,1-diyl))triethanoate ["(BimC$_1$E)$_3$"] or a carboxylic acid thereof or a conjugate base of the carboxylic acid thereof ["(BimC$_1$A)$_3$"], such as the potassium salt;

tri-tert-butyl 2,2',2"-(2,2',2"-nitrilotris(methylene)tris (1H-benzimidazole-2,1-diyl))triethanoate ["(Bim C$_1$E')$_3$"] or a carboxylic acid thereof or a conjugate base of the carboxylic acid thereof ["(BimC$_1$A)$_3$"], such as the potassium salt;

triethyl 4,4',4"-(2,2',2"-nitrilotris(methylene)tris(1H-benzimidazole-2,1-diyl))tributanoate ["BimC$_3$E)$_3$"] or a carboxylic acid thereof or a conjugate base of the carboxylic acid thereof ["(BimC$_3$A)$_3$"], such as the potassium salt thereof;

5,5',5"-(2,2',2"-nitrilotris(methylene)tris(1H-benzimidazole-2,1-diyl))tributanoate, or a conjugate acid thereof;

ethyl 5-(2-((bis((1H-benzimidazol-2-yl)methyl)amino) methyl)-1H-benzo[d]imidazol-1-yl)pentanoate ["BimH)$_2$(BimC$_4$E)"] or a carboxylic acid thereof or a conjugate base of the carboxylic acid thereof ["BimH)$_2$(BimC$_4$A)"], such as the potassium salt thereof;

diethyl 5,5'-(2,2'-(benzo[d]thiazol-2-ylmethylazanediyl) bis(methylene)bis(1H-benzo[d]imidazole-2,1-diyl))dipentanoate ["(Bth)(BimC$_4$E)$_2$"] or a carboxylic acid thereof or a conjugate base of the carboxylic acid thereof ["(Bth)(BimC$_4$A)$_2$"], such as the potassium salt thereof;

triethyl 5,5',5"-(2,2',2"-nitrilotris(methylene)tris(1H-benzimidazole-2,1-diyl))tripentanoate ["(BimC$_4$E)$_3$"] or the carboxylic acid thereof or a conjugate base of the carboxylic acid thereof ["(BimC$_4$A)$_3$"], such as the potassium salt;

triethyl 5,5',5"-(2,2',2"-nitrilotris(methylene)tris(5,6-dimethyl-1H-benzimidazole-2,1-diyl))tripentanoate ["(BimC$_4$E/Me$_2$)$_3$"] or the carboxylic acid thereof or a conjugate base of the carboxylic acid thereof ["(BimC$_4$A/Me$_2$)$_3$"], such as the potassium salt;

diethyl 6,6'-(2,2'-((1H-benzo[d]imidazol-2-yl)methylazanediyl)bis(methylene)-bis(1H-benzimidazole-2,1-diyl))dihexanoate ["(BimH)(BimC$_5$E)$_2$"] or the carboxylic acid thereof or a conjugate base of the carboxylic acid thereof ["(BimH)(BimC$_5$A)$_2$"], such as the potassium salt;

triethyl 6,6',6"-(2,2',2"-nitrilotris(methylene)tris(1H-benzimidazole-2,1-diyl))trihexanoate ["(BimC$_5$E)$_3$"] or the carboxylic acid thereof or a conjugate base of the carboxylic acid thereof ["(BimC$_5$A)$_3$"], such as the potassium salt;

tris((1-benzyl-1H-1,2,3-triazol-4-yl)methyl)amine [TBTA]; or tris(2-pyridylmethyl)amine ["(Py)$_3$"].

Some of the ligands, such as nitrilotris(2-benzimidazolylmethyl-6-sulfonic acid, contain several acid groups. The reference to a conjugate base refers to the mono-salt (e.g. mono-sulfonate or mono-carboxylate salt), the di-salt or the tri-salt of the acid. Some of the ligands, such as triethyl 2,2',2"-(2,2',2"-nitrilotris(methylene)tris(1H-benzimidazole-2,1-diyl))triethanoate ["(BimC$_1$E)$_3$"], contain several ester groups. The reference to a carboxylic acid thereof refers to the mono-, di- or tri-carboxylic acid of the ligand (e.g. after hydrolysis of one or more of the ester groups).

In general, the heterocyclic group of each of $G_1$, $G_2$ and $G_3$ may be optionally substituted with one or more substituents selected from $C_1$ to $C_6$ alkyl, $C_2$ to $C_6$ alkenyl, $C_2$ to $C_6$ alkynyl, halo, fluoro-($C_1$ to $C_6$ alkyl), cyano, nitro, $C_6$ to $C_{10}$ aryl, $C_3$ to $C_8$ carbocyclyl, $C_1$ to $C_6$ alkoxy, $C_6$ to $C_{10}$ aryloxy, $C_3$ to $C_8$ carbocyclyloxy, a water solubilising group and a fluorophore group. It is preferred that each of $G_1$, $G_2$ and $G_3$ is optionally substituted with one or more substituents selected from $C_1$ to $C_6$ alkyl, $C_2$ to $C_6$ alkenyl, $C_2$ to $C_6$ alkynyl, halo, $C_1$ to $C_6$ alkoxy, $C_6$ to $C_{10}$ aryloxy, a water solubilising group and a fluorophore group.

When the heterocyclic group of each of $G_1$, $G_2$ and $G_3$ is optionally substituted with a fluorophore group, then it is preferred that the fluorophore group is a coumarin derivative.

When the heterocyclic group of each of $G_1$, $G_2$ and $G_3$ is optionally substituted with a water solubilising group, then it is preferred that the water solubilising group is a carboxylic acid group (—COOH) or a conjugate base, an ester, an anhydride or an amide thereof; or a sulfonic acid group (—SO$_3$H) or a conjugate base, a sulfonic ester, a sulfonic anhydride or a sulfonamide thereof. More preferably, the water solubilising group is a carboxylic acid group (—COOH), a sulfonic acid group (—SO$_3$H) or a conjugate base thereof.

The metal complex may be a zwitterion or may further comprise a counterion. The counterion is either an anion or a cation. The presence of an anion or a cation in the metal complex will depend on the overall charge of the species comprising the metal.

The counterion is preferably a monovalent counterion (i.e. the counterion has a charge of +1 or −1).

It is generally preferred that the counterion is a non-coordinating counterion. Such counterions are well-known in the art.

For example, when the metal complex comprises a counter anion, then the anion may be selected from perchlorate (ClO$_4$-), tetrafluoroborate (BF$_4$-), hexafluorophosphate (PF$_6$-), tetrakis[3,5-bis(trifluoromethyl)phenyl]borate and tetrakis(pentafluorophenyl)borate.

When the metal complex comprises a counter cation, then the cation may be selected from an alkali metal cation (e.g. Li$^+$, Na$^+$, K$^+$), an alkaline earth metal cation (e.g. Ca$^{2+}$, Mg$^{2+}$) and an ammonium cation (NH$_4^+$).

The counter cation or counter anion may be an agriculturally acceptable salt. The agriculturally acceptable salt may provide the desired solubility, bioefficacy, toxicity and environmental safety characteristics for the intended use.

The metal complex may comprise a second ligand. The second ligand may be a coordinating solvent, such as water.

The invention also provides, in a third aspect, a method of preparing a metal complex. The method comprises mixing in solution (a) a salt of a metal selected from the group consisting of zinc (Zn), cobalt (Co), copper (Cu), nickel (Ni) and iron (Fe) with (b) the ligand as described above.

The salt of the metal may be a perchlorate (ClO$_4$-) salt of the metal, a tetrafluoroborate (BF$_4$) salt of the metal, a hexafluorophosphate (PF$_6$-) salt of the metal, a tetrakis[3,5-bis(trifluoromethyl)phenyl]borate salt of the metal or a tetrakis(pentafluorophenyl)borate salt of the metal.

Additionally, or alternatively, the salt of the metal may be an acetate salt of the metal, a halide salt of the metal, or a nitrate salt of the metal.

The solution of the salt of the metal and the ligand may be prepared by either (a) adding the salt of the metal to a solution of the ligand, (b) adding the ligand to a solution of the salt of the metal or (c) simultaneously adding the salt of the metal and the ligand to a solvent.

The solution of the salt of the metal and the ligand may be refluxed.

The metal complex may be purified using conventional techniques.

In a fourth aspect, the invention provides a formulation. The formulation comprises a metal complex or a precursor thereof in accordance with the invention. As mentioned above, the precursor comprises the ligand for preparing the metal complex optionally in combination with a metal salt for preparing the metal complex.

The formulation may further comprise a biological agent and/or an agrochemical. The biological agent includes, for example, bacteria, fungi, nematodes or viruses. The biological agent is typically beneficial in promoting growth.

The agrochemical may, for example, include a fertiliser, a plant activator, a pesticide, a fungicide, a herbicide, an insecticide or a nematicide.

The formulation may be an aqueous solution comprising the metal complex or a precursor thereof.

EXAMPLES

The invention will now be illustrated by the following non-limiting examples.

Experimental Details

NMR Spectroscopy $^1$H (400 MHz), $^{13}$C, COSY and HMQC/HSQC NMR spectra were acquired on a Bruker AMX-400 spectrometer at room temperature. Coupling constants are quoted in Hz and the multiplicities are quoted as follows: s=singlet, d=doublet, t=triplet, q=quartet, m=multiplet and b=broad.

Mass Spectrometry

Electrospray Time-of-Flight mass spectra were recorded using a Waters LCT Premier.

Chromatography

Thin-layer chromatography was performed using pre-coated aluminium-backed alumina plates (Aluminium oxide 60, F$_{254}$, neutral) and visualisation achieved under a UV lamp. Column chromatography was achieved using type I neutral alumina.

Elemental Analysis

Elemental analysis was carried out by the Elemental Analysis Service at London Metropolitan University.

Reagents

All reagents were bought from Sigma Aldrich, Fisher Scientific, VWR or Fluorochem and were used "stock" without further purification. Deuterated NMR solvents were bought from Goss scientific.

Synthesis of Ligands

The ligands were synthesised using a modified version of the conditions detailed by V. O. Rodionov et.al. (*J. Am. Chem. Soc.*, 129 (42), (2007), 12696-704).

Synthesis of (BimH)$_3$—"3N Ligand"

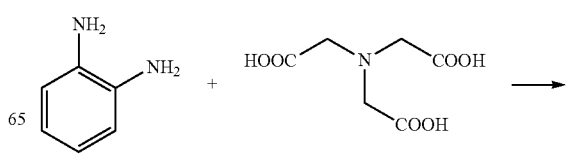

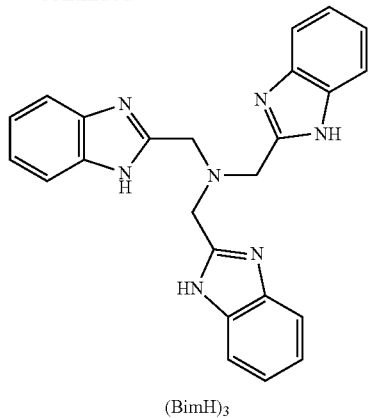

(BimH)₃ o-Phenylenediamine (4.22 g, 39 mmols), nitrilotriacetic acid (2.48 g, 13 mmols) and ethylene glycol (30 ml) were all added to an appropriate round bottom flask, which was then heated to 200° C. under stirring, at which point the brown solution became purple. The reaction was left overnight under reflux using a waterless condenser. The flask was removed from the heat and left to cool to room temperature. Once cooled, the contents were transferred to a beaker and ice water was added, forming a precipitate. The mixture was stirred for 5 minutes at room temperature, after which it was filtered in vacuo to give a pink solid. The precipitate was left to dry overnight. The crude product was recrystallized from ethanol and left to dry in air, affording a pure peach solid. Yield 93%. δH/ppm (400 MHz, DMSO) 12.45 (s, 3H), 7.57 (m, 6H), 7.17 (m, 6H), 4.15 (s, 6H); m/z (ES-ToF); 408.19 ([M+H]⁺).

Synthesis of (Bth)₃—"3S Ligand"

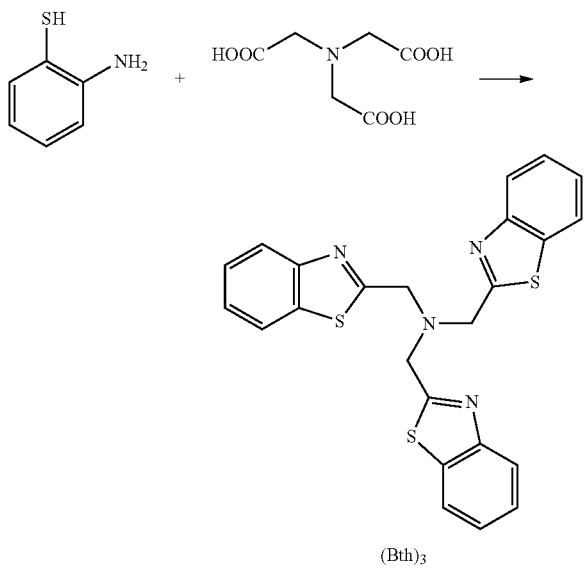

(Bth)₃

2-Aminothiophenol (4.88 g, 39 mmols), nitrilotriacetic acid (2.48 g, 13 mmols) and ethylene glycol (30 ml) were all added to an appropriate round bottom flask, which was then heated to 200° C. under stirring, at which point the yellow solution became amber. The reaction was left overnight under reflux using a waterless condenser. The flask was removed from the heat and left to cool to room temperature. Once cooled, the contents were transferred to a beaker and ice water was added, forming a precipitate. The mixture was stirred for 5 minutes at room temperature, after which it was filtered in vacuo to give a yellow solid. The precipitate was left to dry overnight. The crude product was recrystallized from ethanol and left to dry in air, affording a pure yellow solid. Yield 44%. δH/ppm (400 MHz, DMSO) 8.16-8.12 (m, 3H), 7.98-7.94 (m, 3H), 7.50-7.43 (m, 6H), 4.40 (s, 6H); m/z (ES-ToF); 459.08 ([M+H]⁺).

Synthesis of H(BimH)₂—"2N Ligand"

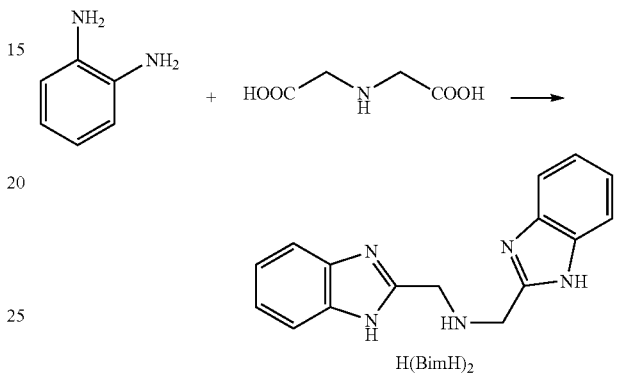

H(BimH)₂ o-Phenylenediamine (4.55 g, 42.1 mmols), nitrilodiacetic acid (2.80 g, 20.9 mmols) and ethylene glycol (45 ml) were all added to an appropriate round bottom flask, which was then heated to 200° C. under stirring, at which point the brown solution became purple. The reaction was left overnight under reflux using a waterless condenser. The flask was removed from the heat and left to cool to room temperature. Once cooled, the contents were transferred to a beaker and ice water was added, forming a precipitate. The mixture was stirred for 5 minutes at room temperature, after which it was filtered in vacuo to give a pink solid. The precipitate was left to dry overnight. The crude product was recrystallized from ethanol/water and left to dry in air, affording a pure light brown solid. Yield 66%. δH/ppm (400 MHz, DMSO) 12.27 (s, 2H), 7.54-7.50 (m, 4H), 7.16-7.07 (m, 4H), 3.98 (s, 4H); m/z (ES-ToF); 278.14 ([M+H]⁺).

Synthesis of H(Bth)₂—"2S Ligand"

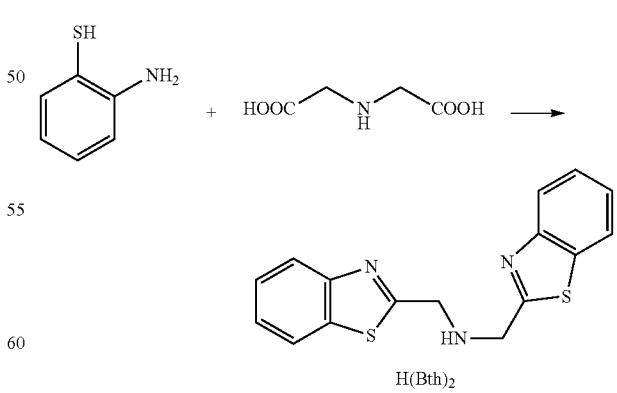

H(Bth)₂

2-Aminothiophenol (4.25 g, 42.1 mmols), nitrilodiacetic acid (2.80 g, 20.9 mmols) and ethylene glycol (45 ml) were all added to an appropriate round bottom flask, which was then heated to 200° C. under stirring, at which point the yellow solution became amber. The reaction was left overnight under reflux using a waterless condenser. The flask was removed from the heat and left to cool to room temperature. Once cooled, the contents were transferred to a beaker and an ethanol: ice water mixture was added, forming a precipitate. The mixture was stirred for 5 minutes at room temperature, after which it was filtered in vacuo to give a yellow solid. The precipitate was left to dry overnight. The crude product was recrystallized from ethanol and left to dry in air, affording a pure yellow solid. Yield 40%. δH/ppm (400 MHz, DMSO) 8.09 (dd, J=1.8 and 7.2 Hz, 2H), 7.92 (dd, J=1.8 and 7.2 Hz, 2H), 7.53-7.37 (m, 4H), 4.28 (s, 4H); m/z (ES-ToF); 312.06 ([M+H]$^+$).

Synthesis of (BimH)$_2$(Bth)—"2N1S Ligand"

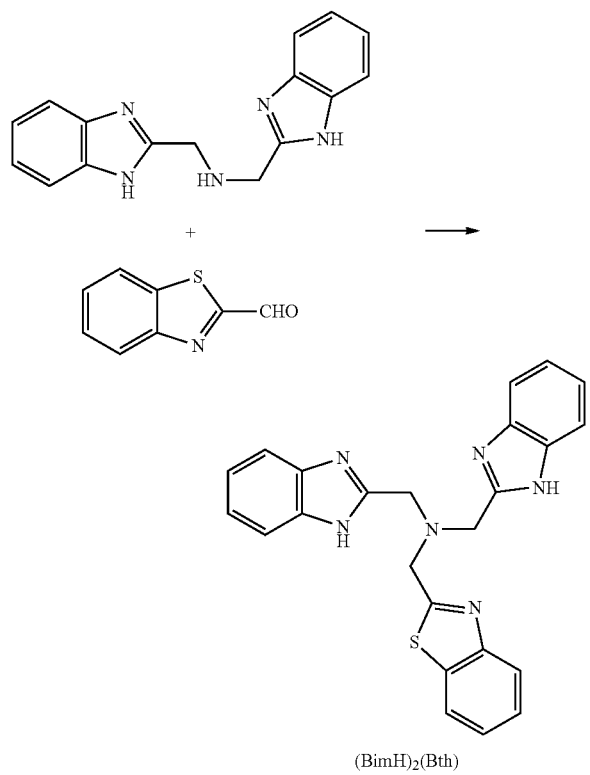

(BimH)$_2$(Bth)

H(BimH)$_2$ (0.963 g, 2.5 mmols) and 2-benzothiazolecarboxaldehyde (0.429 g, 2.63 mmols) were dissolved in 50 ml dry THF forming a clear brown solution. Glacial acetic acid (0.6 g, 10 mmols) was added and the solution was stirred for one hour. Sodium triacetoxyborohydride (1.06 g, 5 mmols) was added and the solution was left stirring under nitrogen at room temperature. After 48 hours, the clear brown solution became an opaque light brown solution. The reaction mixture was transferred to a separating funnel containing 50 ml water and 50 ml DCM. The aqueous layer was extracted twice more with 50 ml DCM and the combined organic fractions were extracted once with 50 ml water. The solvent was rotary evaporated and the crude product was purified by column chromatography (1% MeOH in DCM) on an alumina column producing a yellow/orange solid. Yield 56%. δH/ppm (400 MHz, DMSO) 12.45 (s, 2H), 8.06 (dd, J=1.2 and 7.8 Hz, 1H), 7.94 (dd, J=1.2 and 7.8 Hz, 1H), 7.60-7.40 (m, 6H), 7.19-7.15 (m, 4H), 4.39 (s, 2H), 4.22 (s, 4H); m/z (ES-ToF); 425.16 ([M+H]$^+$).

Synthesis of (BimH)(Bth)$_2$—"1N2S Ligand"

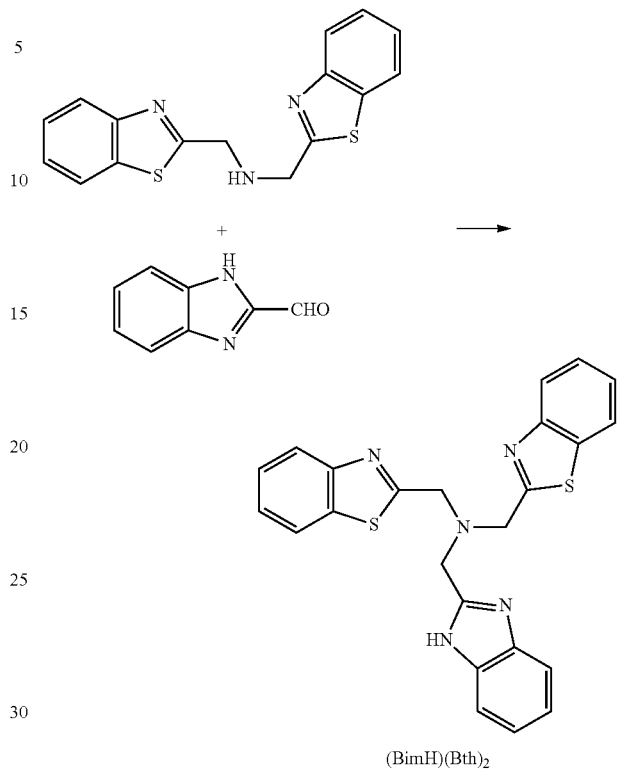

(BimH)(Bth)$_2$

H(Bth)$_2$ (0.625 g, 2 mmols) and 2-benzimidazolecarboxaldehyde (0.438 g, 3 mmols) were dissolved in 50 ml dry THF under sonication forming an opaque cream solution. Glacial acetic acid (0.6 g, 10 mmols) was added and the solution was stirred for one hour. Sodium triacetoxyborohydride (1.06 g, 5 mmols) was added and the solution was left stirring under nitrogen at room temperature. After 48 hours, a further 10 mmol glacial acetic acid was added. After five days, an additional 10 mmol glacial acetic acid and 5 mmol sodium triacetoxyborohydride were added. After one week, the opaque cream solution had become a clear light brown solution. Proton NMR showed complete consumption of starting aldehyde. The reaction mixture was transferred to a separating funnel containing 50 ml water and 50 ml DCM. The aqueous layer was extracted twice more with 50 ml DCM and the combined organic fractions were extracted once with 50 ml water. The solvent was rotary evaporated and the crude product was purified by column chromatography (1% MeOH in DCM) on an alumina column producing a yellow/orange solid. Yield 68%. δH/ppm (400 MHz, DMSO) 12.34 (s, 1H), 8.12 (dd, J=1.0 and 6.6 Hz, 2H), 7.95 (dd, J=1.0 and 6.6 Hz, 2H), 7.54-7.42 (m, 6H), 7.20-7.15 (m, 2H), 4.49 (s, 4H), 4.21 (s, 2H); m/z (ES-ToF); 442.12 ([M+H]$^+$).

Synthesis of Zinc Complexes

Each of the ligands described above was used to prepare a zinc complex using the general method below. The abbreviated notation given above is used to identify each ligand (e.g. Zn3N is a zinc complex of the "3N ligand", which is (BimH)$_3$).

Zinc perchlorate hexahydrate (0.37 g, 1 mmol), the ligand (1 mmol) and ethanol (10 ml) were added to an appropriate round bottom flask, which was then heated to 80° C. under stirring. The reaction was left under reflux for 1 hour, after which a colour change usually occurs. The flask was removed from the heat and left to cool to room temperature. Once cooled, the contents were transferred to a beaker and ice water added. The mixture was left to stand for several minutes, after which a precipitate formed. The precipitate was filtered in vacuo to give the solid. The precipitate was left to dry overnight. No purification of the crude product was required. The characterisation data for each of the zinc complexes that were prepared is as follows.

Zn3N

Yield 56%; δH/ppm (400 MHz, Acetone) 12.60 (b, s, 3H), 8.11 (s, 3H), 7.71 (s, 3H), 7.44 (s, 6H), 4.98 (s, 6H); m/z (ES-ToF); 516.11 ([M+HCO$_2$]$^+$); Anal. Calcd. For [(OH$_2$)Zn((BimH)$_3$)](ClO$_4$)$_2$: C, 41.79; H, 3.36; N, 14.21. Found: C, 41.85; H, 3.35; N, 13.88.

Zn3S

Yield 69%; δH/ppm (400 MHz, Acetone) 8.63 (d, $^3J_{H-H}$=8.4 Hz, 3H), 8.17 (d, $^3J_{H-H}$=8.3 Hz, 3H), 7.72 (t, $^3J_{H-H}$=8.5, 7.4 Hz, 3H), 7.59 (t, $^3J_{H-H}$=8.3, 7.4, 3H), 5.40 (s, 6H); m/z (ES-ToF); 556.97 ([M+HCO$_2$]$^+$); Anal. Calcd. For [(OH$_2$)Zn((Bth)$_3$)](ClO4)$_2$: C, 38.91; H, 2.72; N, 7.56. Found: C, 38.78; H, 2.60; N, 7.14.

Zn2N

Yield 35%; δH/ppm (400 MHz, Acetone) 12.49 (s, 2H), 8.03 (dt, $^3J_{H-H}$=7.8, 3.2 Hz, 2H), 7.72 (dt, $^3J_{H-H}$=7.7, 3.5 Hz, 2H), 7.48-7.37 (m, 4H), 4.93 (s, 4H); m/z (ES-ToF); 386.06 ([M+HCO$_2$]$^+$); Anal. Calcd. For [(OH$_2$)Zn(H(BimH)$_2$)](ClO$_4$)$_2$: C, 34.34; H, 3.06; N, 12.51. Found: C, 34.73; H, 3.20; N, 12.72.

Zn2S

Yield 50%; δH/ppm (400 MHz, Acetone) 8.19 (d, $^3J_{H-H}$=8.1 Hz, 2H), 8.01 (d, $^3J_{H-H}$=8.1 Hz, 2H), 7.69-7.58 (m, 4H), 5.08 (s, 4H); m/z (ES-ToF); 409.08 ([M+CH$_3$OH+H]$^+$); Anal. Calcd. For [(OH$_2$)Zn(H(Bth)$_2$)](ClO$_4$)$_2$: C, 32.37; H, 2.55; N, 7.08. Found: C, 32.23; H, 2.33; N, 7.37.

Zn2N1S

Yield 60%; δH/ppm (400 MHz, DMSO) 13.41 (s, 2H), 8.37 (s, 1H), 8.16 (d, $^3J_{H-H}$=8.0 Hz 1H), 7.95 (s, 2H) 7.77-7.46 (m, 4H), 7.34 (m, 4H), 4.76 (s, 2H), 4.72 (s, 4H); m/z (ES-ToF); 533.07 ([M+HCO$_2$]$^+$); Anal. Calcd. For [(OH$_2$)Zn((BimH)$_2$(Bth))](ClO$_4$)$_2$: C, 40.78; H, 3.14; N, 11.89. Found: C, 40.72; H, 3.18; N, 11.90.

Zn1N2S

Yield 61%; δH/ppm (400 MHz, DMSO) 12.48 (s, 1H), 8.14 (dt, $^3J_{H-H}$=8.0, 0.9 Hz, 2H), 8.01 (s, 1H), 7.68 (s, 1H) 7.53 (t, $^3J_{H-H}$=7.6 Hz, 3H), 7.45 (td, $^3J_{H-H}$=7.6, 1.2 Hz, 2H), 7.21 (dd, $^3J_{H-H}$=6.2, 2.9 Hz), 4.56 (s, 4H), 4.29 (s, 2H); m/z (ES-ToF); 550.04 ([M+HCO$_2$]$^+$); Anal. Calcd. For [(OH$_2$)Zn((BimH)(Bth)$_2$)](ClO$_4$)$_2$: C, 38.86; H, 2.84; N, 9.85. Found: C, 38.69; H, 2.95; N, 9.56.

Kinetic measurement of CO$_2$ hydration and HCO$_3$- dehydration via Stopped Flow

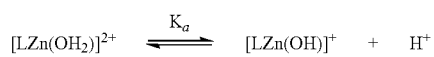

CO$_2$ hydration:

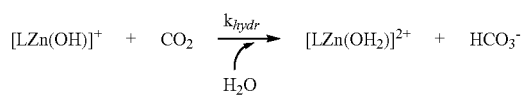

HCO$_3$- dehydration:

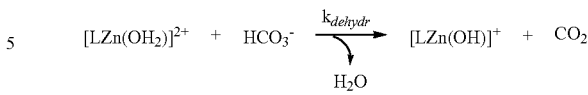

The hydration and dehydration rate measurements were undertaken by detecting the associated pH change through the use of an appropriate colorimetric pH indicator via stopped-flow equipment (Applied Photophysics SX-20 Stopped-flow Spectrometer) as described by B. H. Gibbons et al. (J. Biol. Chem., 238(10), (1963), 3502-3507). The pH time-dependence of CO$_2$ hydration or HCO$_3$- dehydration was observed via the absorbance change of a buffered indicator solution in order to measure the change in $V_{hydr/dehydr}$ over a concentration range of zinc mimic, and to determine the observed rate constant ($k_{obs}$) for each reaction.

Following the procedure reported by K. Nakata et al. (J. Inorg. Biochem., 89, (2002), 255-266), a 0.1 M buffer solution containing 10×10$^{-5}$M indicator, 0.2 M NaClO$_4$ and varying concentrations of the zinc complex in DMSO 1:9 H$_2$O were loaded into one syringe and a CO$_2$ or HCO$_3$- aqueous solution in the other. CO$_2$ saturated solutions (33.8 mM) were prepared by bubbling CO$_2$ gas through water for 1 hour at 25° C. The saturated solution was diluted appropriately to give the desired concentration of CO$_2$. HCO$_3$- solutions were prepared by dissolving NaHCO$_3$ in water to give the desired concentration of HCO$_3$-. The buffer-indicator pairs were chosen based upon their similar pKa's, and the pH of the buffer-indicator solution was adjusted to match these pKa's to maximize sensitivity to pH change (see Table 2).

TABLE 2

Buffer indicator pairs and their associated studied wavelength

| pH | Buffer | Indicator | Wavelength (nm) |
|---|---|---|---|
| 7.4 | HEPES | Phenol red | 557 |
| 8.2 | TAPS | m-Cresol purple | 579 |

Upon mixing of the two syringes, the change in absorbance over time was measured at 25° C. For each buffer solution employed over the tested pH range, the buffer factor (change in absorbance vs concentration of HCl/NaOH) and linearity of CO$_2$ and HCO$_3$- (change in absorbance vs concentration of CO$_2$/HCO$_3$-) were determined as controls.

Based upon the linearity of the response between CO$_2$ or HCO$_3$- concentration and change in absorbance, appropriate concentrations of CO$_2$ or HCO$_3$- were chosen within the linear range for the subsequent complex runs. At each concentration of complex, the $V_{hydr}$ (rate of hydration) and $V_{dehyd}$ (rate of dehydration) was measured and $k_{obs}$ (observed rate constant) was calculated as per the procedure of by K. Nakata et al. (J. Inorg. Biochem., 89, (2002), 255-266).

Briefly, $V_{hyd/dehyd}$=-Q(A$_0$-A$_e$)[d(ln(A-A$_e$))/dt]$_{t \to 0}$, where Q=buffer factor. The function [d(ln(A-A$_e$))/dt]$_{t \to 0}$ was taken from fitting the first linear portion of the time-dependent absorbance data with a single exponential decay function. $k_{obs}$ was calculated as the slope of the linear fit between mimic concentration and $V_{hyd/dehyd}$/[S]. $k_{cat}$ (catalytic rate constant) was calculated as the pH independent catalyst rate constant as per K. Nakata et al. (J. Inorg. Biochem., 89, (2002), 255-266) and L. Koziol et al. (Inorg.

Chem., 51(12), (2012) 6803-12) for the hydration reaction ($k_{cat}=k_{obs}\times(([H^+]/Ka)+1)$), and Y.-J. Sun et al. (*Inorg. Chem. Commun.*, 7(2), (2004), 165-168) for the dehydration reaction ($k_{cat}=(k_{obs}\times([H^+]+Ka)/[H^+])$). Each run of 3 repeats was undertaken 3 times and the average taken, to give N=9. The results are shown in Tables 3 and 4 below.

TABLE 3

Low substrate concentration (1.69 mM)

| | pH 7.4 | | Hydration: |
|---|---|---|---|
| Complex | Hydration $k_{obs}$ (M$^{-1}$ s$^{-1}$) | Dehydration $k_{obs}$ (M$^{-1}$ s$^{-1}$) | Dehydration Ratio |
| ZnL1S | ~550 | 132.5 ± 9.6 | 4.15 |
| Zn3N | 512.3 ± 60.3 | 124.1 ± 1.8 | 4.13 |
| Zn3S | 429.7 ± 51.2 | 140.8 ± 4.8 | 3.05 |
| Zn2N1S | 495.4 ± 34.0 | 157.6 ± 2.1 | 3.14 |
| Zn1N2S | 440.8 ± 24.5 | 171.3 ± 4.5 | 2.57 |
| Zn2N | 370.6 ± 13.4 | 94.1 ± 1.6 | 3.94 |
| Zn2S | 347.1 ± 33.0 | 115.2 ± 1.8 | 3.01 |

TABLE 4

High substrate concentration (16.9 mM)

| | pH 7.4 | | Hydration: |
|---|---|---|---|
| Complex | Hydration $k_{obs}$ (M$^{-1}$ s$^{-1}$) | Dehydration $k_{obs}$ (M$^{-1}$ s$^{-1}$) | Dehydration Ratio |
| ZnL1S | 31.9 ± 12.8 | 30.5 ± 1.3 | 1.05 |
| Zn3N | 34.4 ± 11.3 | 33.8 ± 0.8 | 1.02 |
| Zn3S | 24.5 ± 10.4 | 37.8 ± 0.8 | 0.65 |
| Zn2N1S | 26.6 ± 11.1 | 44.6 ± 1.6 | 0.60 |
| Zn1N2S | 25.3 ± 8.4 | 51.9 ± 0.5 | 0.49 |
| Zn2N | 22.0 ± 9.3 | 27.5 ± 0.5 | 0.80 |
| Zn2S | 17.5 ± 8.6 | 30.6 ± 0.6 | 0.57 |

From the results in Tables 3 and 4 above, it can be seen that the Zn1N2S complex shows the best specificity toward dehydration. At high concentrations (see Table 4), the dehydration reaction is faster in most cases than the hydration reaction. It is believed that such a result has never previously been observed.

Rubisco Activity Assay

Rubisco was purified using hydrophobic interaction chromatography as per the method of K. O'Donnelly et al. (*Plant methods*, 10, (2014), 17). For all assays, the rate was determined using a non-radioactive microplate-based assay, which determines the product 3-phosphoglycerate (3-PGA) through the oxidation of NADH by optical density measurements at 340 nm at 25° C., adapted from R. Sulpice et al. (*Plant Cell Environ.*, 30(9), (2007), 1163-75) and K. O'Donnelly et al. (*Plant methods*, 10, (2014), 17). A Thermo Scientific Varioskan Flash Multimode microplate reader was used to monitor the oxidation of NADH for 15 minutes every 100 ms.

Figure 3:
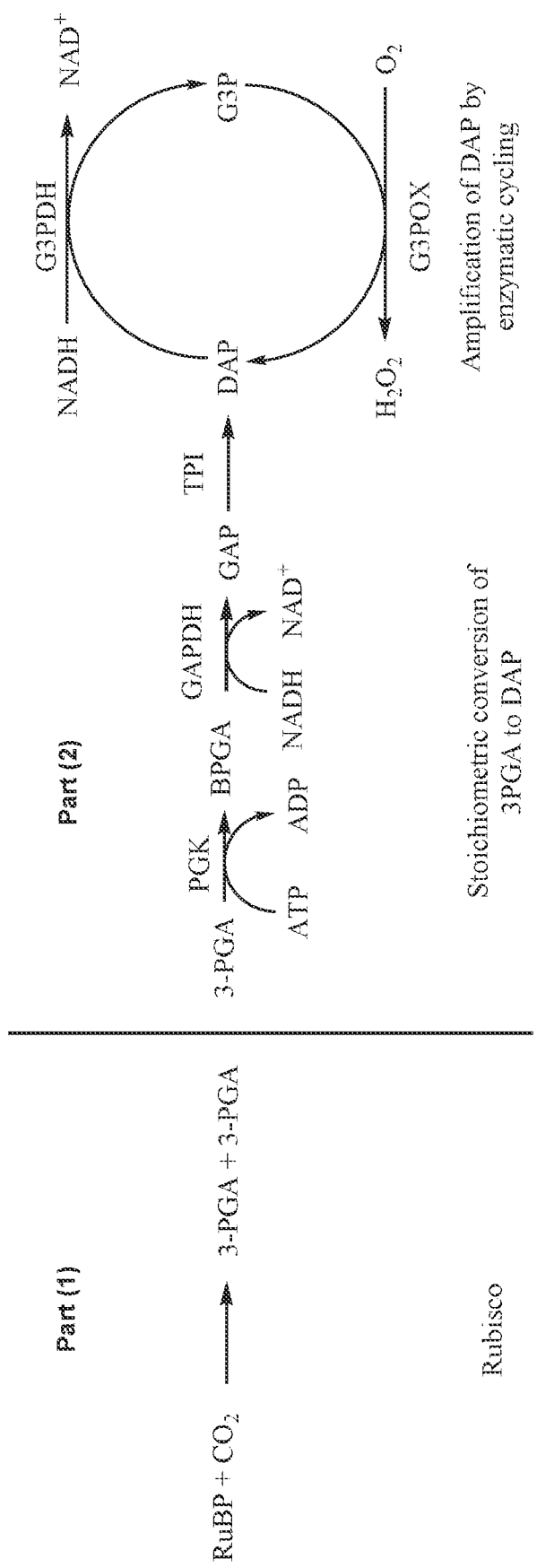
FIG. 3 shows a schematic of a rubisco assay. Part (1) represents a rubisco catalysed reaction, and part (2) represents the cascade of enzymes to covert 3PGA to $G_3P$.
Figure 4:
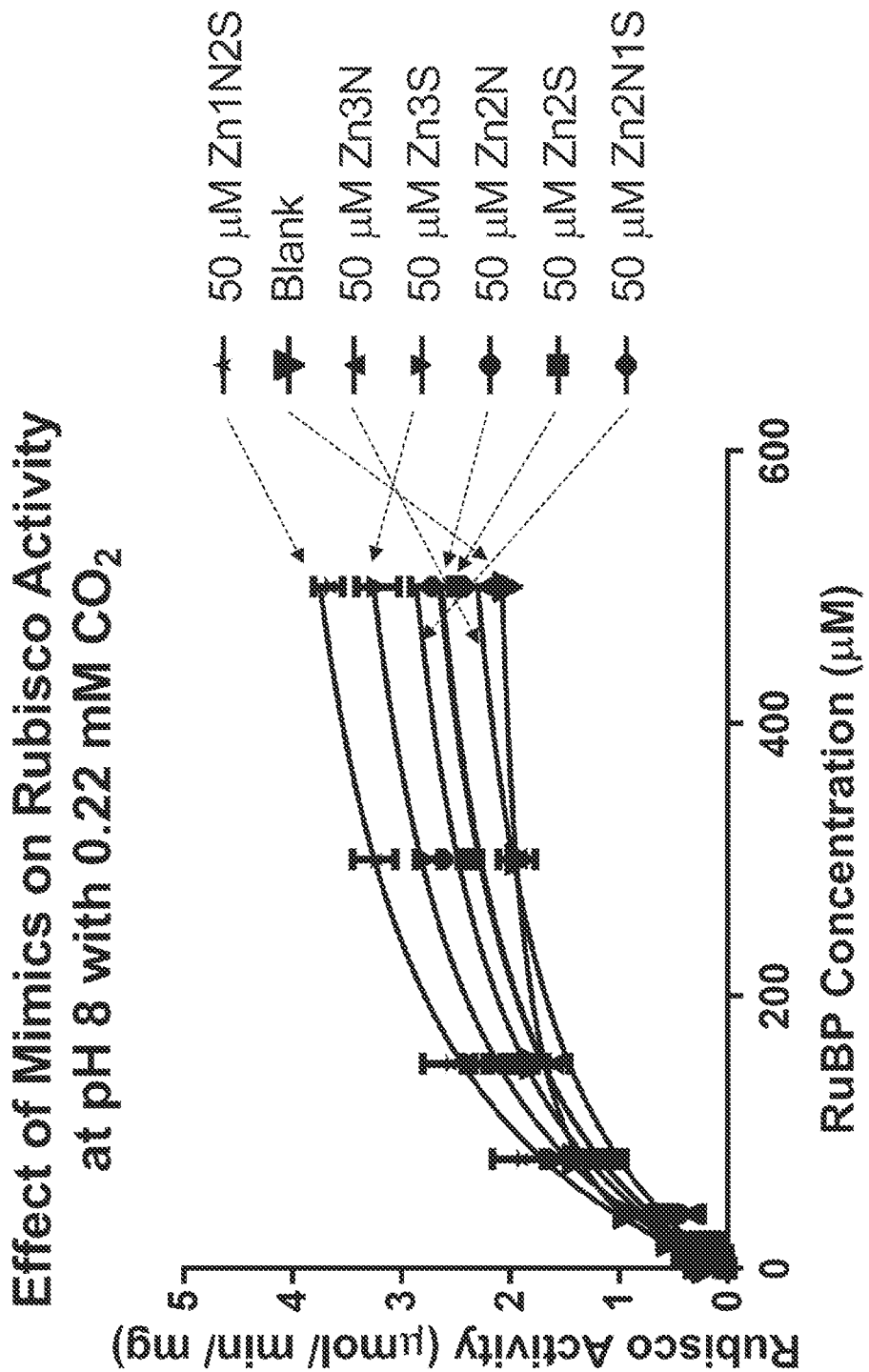
FIG. 4 is a graph showing the effect of various zinc complexes (i.e. carbonic anhydrase mimics) on rubisco activity at pH 8 with 0.22 mM of $CO_2$.
Figure 5:
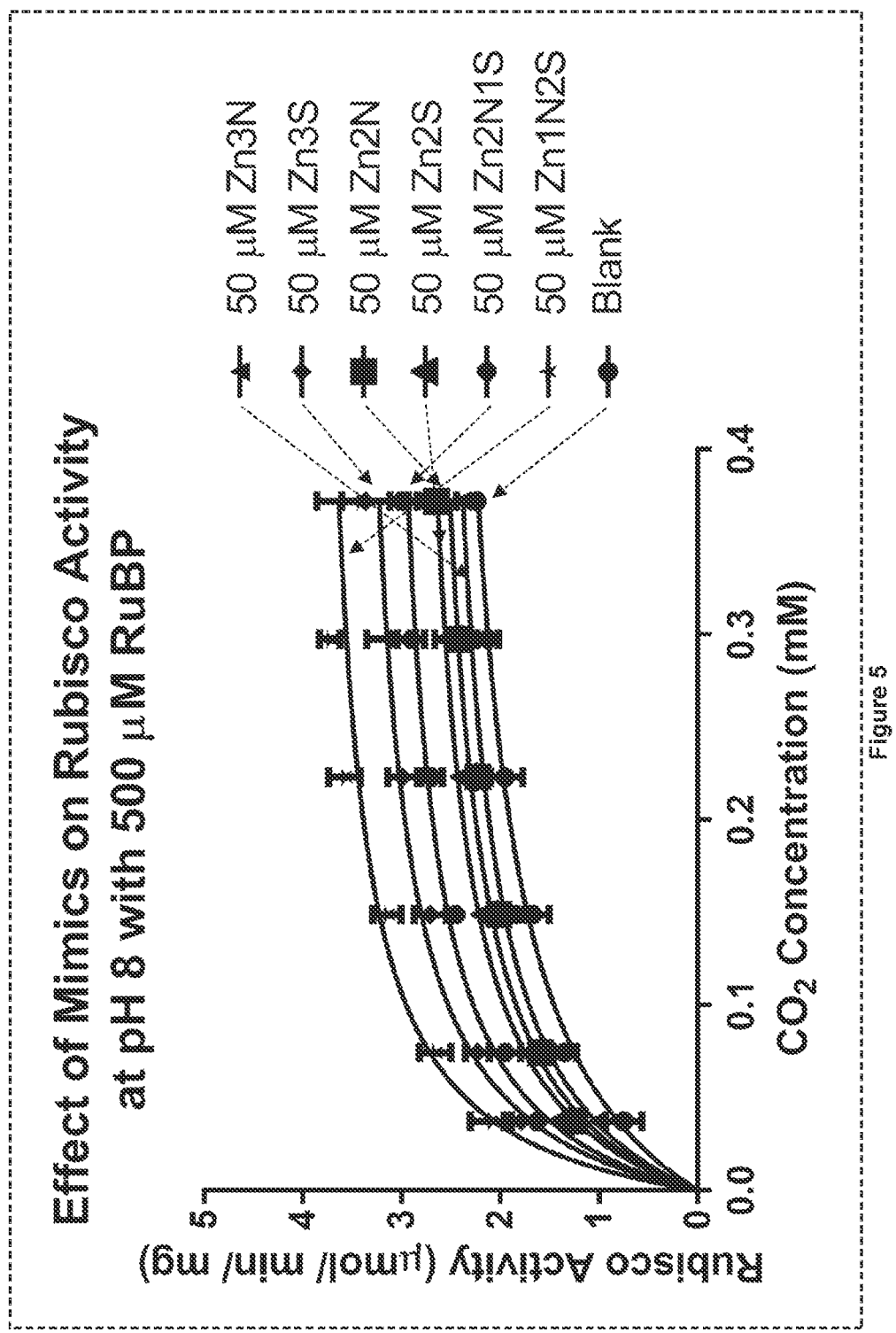
FIG. 5 is a graph showing the effect of various zinc complexes (i.e. carbonic anhydrase mimics) on rubisco activity at pH 8 with 500 μM of ribulose 1,5-biphosphate (RuBP).
Figure 6:
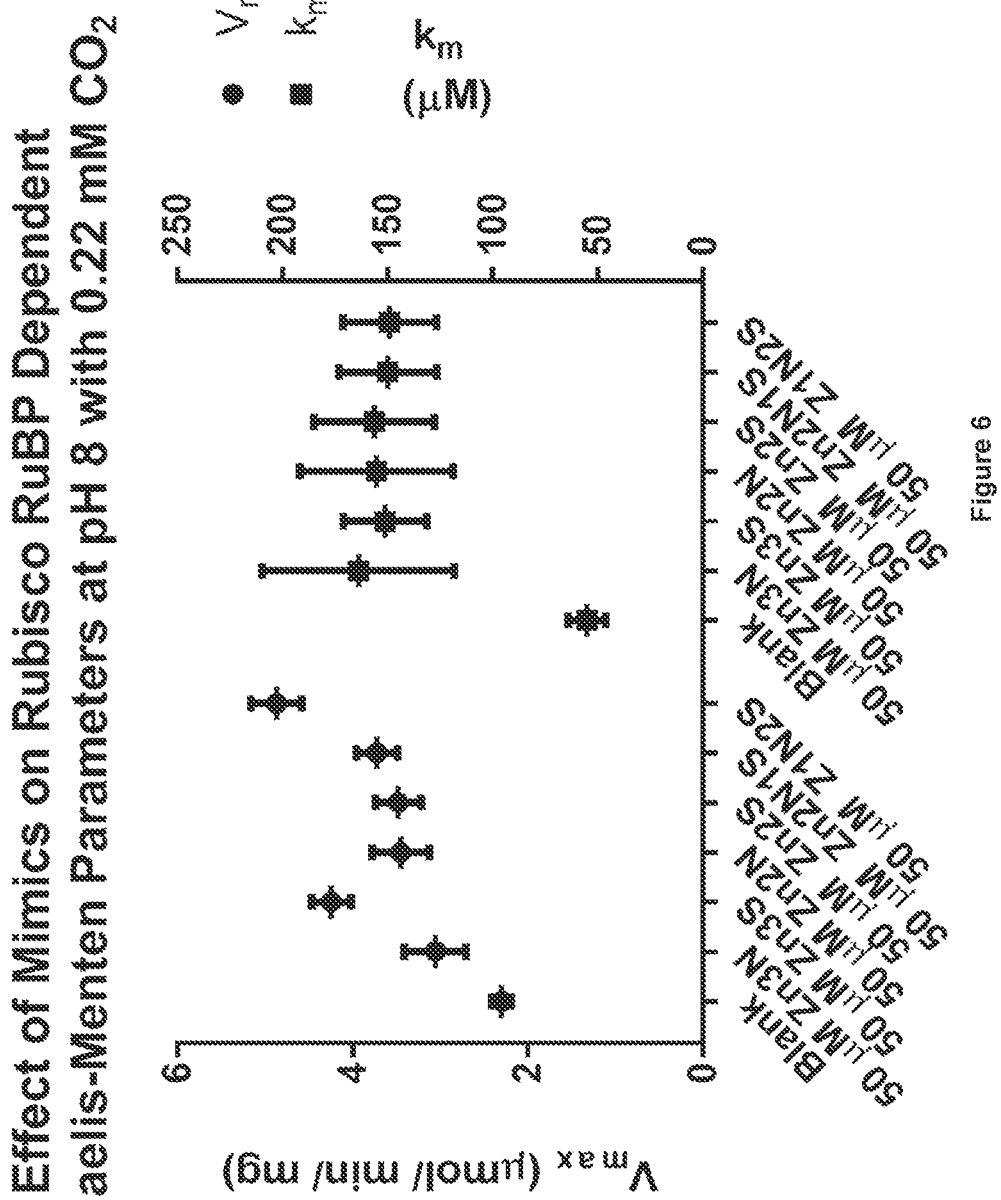
FIG. 6 is a graph showing the effect of various zinc complexes (i.e. carbonic anhydrase mimics) on rubisco-ribulose 1,5-biphosphate (RuBP) dependent Michaelis-Menten parameters at pH 8 with 0.22 mM of $CO_2$.
Figure 7:
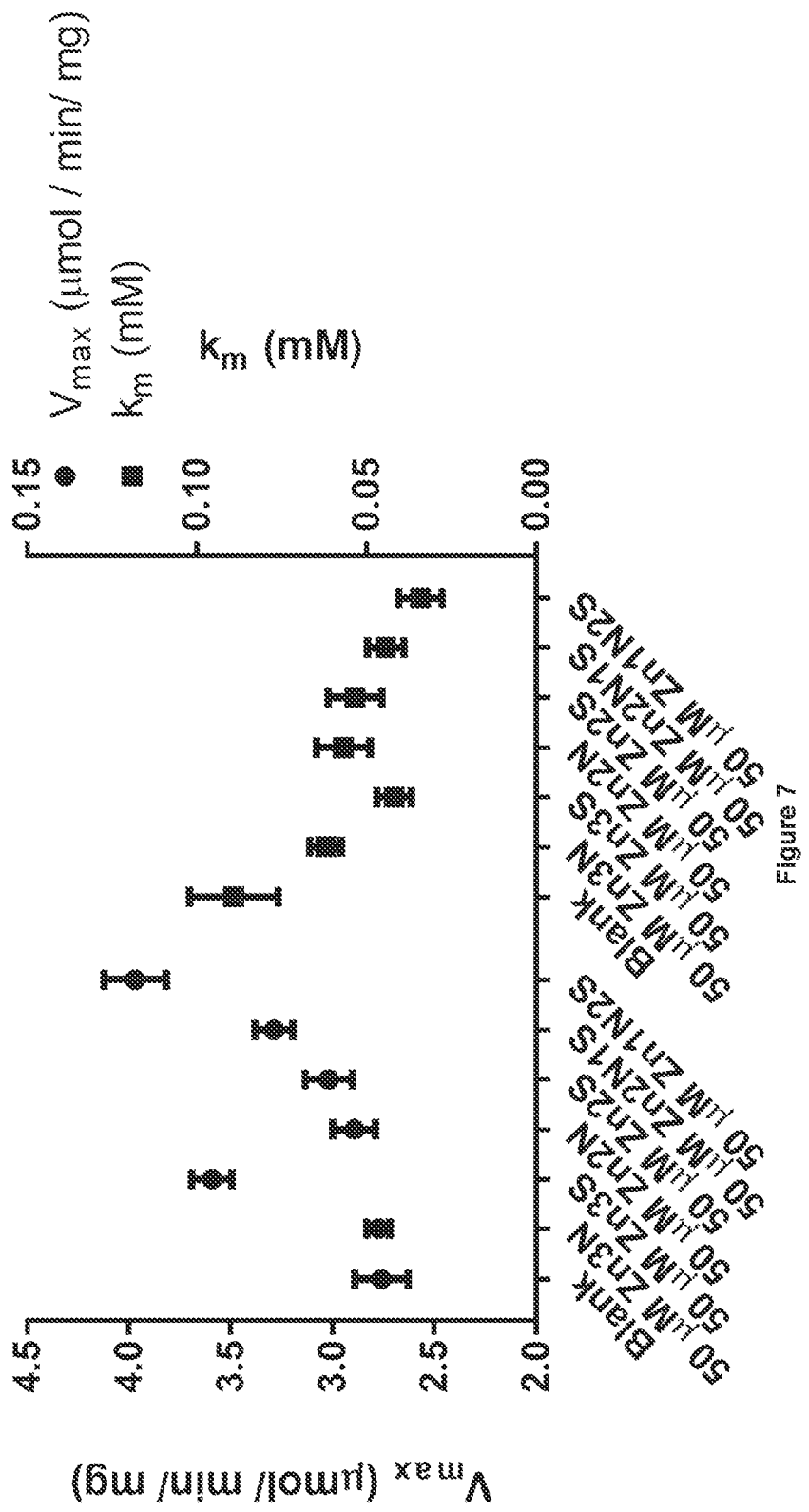
FIG. 7 is a graph showing the effect of various zinc complexes (i.e. carbonic anhydrase mimics) on rubisco-$CO_2$ dependent Michaelis-Menten parameters at pH 8 with 500 μM of ribulose 1,5-biphosphate (RuBP).

FIG. 3 is a schematic of the rubisco assay. Part (1) represents the Rubisco catalysed reaction, and Part (2) represents the cascade of enzymes to covert 3PGA to G$_3$P.

The enzymological properties of Rubisco were typically measured as follows: 10 µL Rubisco and 10 µL of initial buffer were incubated for 15 mins, after which 10 µL of ribulose 1,5-biphosphate (RuBP) was added [Final concentrations for Rubisco assay in 30 µL total volume were 0, 10, 20, 40, 80, 150, 300 and 500 µM RuBP, 0.02 mg/mL Rubisco, 100 mM tricine (pH 8.0/NaOH), 20 mM MgCl$_2$, 2 mM EDTA and 10 mM NaHCO$_3$]. After 60 seconds, 10 µL of absolute ethanol was added to stop the reaction. After 5 mins, 20 µL of the reaction mixture was transferred to a 384-well plate, and 20 µL of determination buffer was added [final concentrations in 40 µL were 1.88 units/mL PGK, 3 units/mL GAPDH, 2.5 units/mL G$_3$PDH-TPI, 50 units/mL G$_3$POX, 700 units/mL catalase, 3 mM ATP, 11 mM NADH, 1 mM MgCl$_2$, 60 mM tricine (pH 8.0, NaOH)]. The activity was calculated as µmol·min$^{-1}$·mg$^{-1}$ using a calibration curve with 3PGA.

384-Well Plate 3PGA Calibration Curve

10 µL 3PGA and 10 µL of initial buffer were incubated for 15 mins in a 384-well plate, after which 10 µL of RuBP was added to start the reaction [Final amounts for 3PGA calibration curve in 30 µL total volume were 500 µM RuBP, 0, 0.005, 0.01, 0.025, 0.05, 0.1, 0.3, 0.6, 0.8 nmol 3PGA, 100 mM tricine (pH 8.0/NaOH), 20 mM MgCl$_2$, 2 mM EDTA and 10 mM NaHCO$_3$]. After 60 seconds, 10 µL of absolute ethanol was added to stop the reaction. After 5 mins 20 µL of the reaction mixture was transferred to a 384 well plate, and 20 µL of determination buffer was added [final concentrations in 40 µL were 1.88 units/mL PGK, 3 units/mL GAPDH, 2.5 units/mL G$_3$PDH-TPI, 50 units/mL G$_3$POX, 700 units/mL catalase, 3 mM ATP, 1 mM NADH, 11 mM MgCl$_2$, 60 mM tricine (pH 8.0, NaOH)]. The rates of reaction were calculated as the maximum decrease of absorbance over time (OD·min$^{-1}$).

Effect of Zinc Mimics on Rubisco Activity

10 µL of Rubisco and 10 µL of pH 8 initial buffer containing varying concentrations of zinc complex were incubated in a 96 well plate for 15 mins. After shaking, 10 µL of RuBP was added to start the reaction [final concentrations of 30 µL mixture contained 0.3 nmol 3PGA, 0-50 µM zinc mimic, 100 mM tricine (pH 8.0), 20 mM MgCl$_2$ and 2 mM EDTA. NaHCO$_3$, and RuBP concentration varied depending on the experiment]. The final pH, after the addition of NaHCO$_3$, and before the addition of Rubisco, was measured as pH 8.0.

After 60 seconds 10 µL of absolute ethanol was added to stop the reaction. 20 µL of the assay mixture was added to a 384 well plate (after 5 mins of incubation with ethanol), and 20 µL of determination buffer was added to start the reaction [final concentrations of enzymes and substrates from Part 2 of reaction in 40 µL were: 1.88 units/mL phosphoglycerate kinase (PGK), 3 units/mL glyceraldehyde-3-phosphate dehydrogenase (GAPDH), 2.5 units/mL α-glycerol-3-phosphate dehydrogenase/triose-P isomerase (G$_3$PDH-TPI), 50 units/mL glycerol-3-phosphate oxidase (G$_3$POX), 700 units/mL catalase, 3 mM ATP, 1 mM NADH, 11 mM MgCl$_2$, 60 mM tricine (pH 8.0, NaOH)]. The activity was calculated as µmol·min$^{-1}$·mg$^{-1}$ using a calibration curve with 3PGA.

FIGS. 4 to 7 show the results that were obtained. All the zinc complexes (i.e. carbonic anhydrase mimics) that were tested were found to increase the V$_{max}$ of rubisco. The Zn3S and Zn1N2S complexes were found to provide a significant improvement in activity.

Effect of Zinc Mimics on Spinach Growth
Plant Material and Growth Conditions

Commercial cultivar spinach seeds (*Spinacia oleracea* L.) were planted in soil mixture of "John Innes Inc. seed sowing compost No2": Vermiculite (4:1) in small pots. Spinach seeds were germinated in a Sanyo MLR-352 growth chamber under day (photosynthetically active photon flux density (PPFD) at 110-130 µmol·m-2s-1) and night conditions, changing every 12 hours. Air temperature was maintained at 20° C. and 15° C. during day and night conditions, respectively, with a constant relative humidity at 65%. Spinach plants were irrigated three times a week. At the second true leaf stage (approximately 3 weeks from seed germination), the seeds were transferred into larger singular pots in "John Innes No2—Potting on compost" soil. No extra fertilizer was added.

Treatments

At the fourth true leaf stage (roughly 4-6 weeks after germination), the treatment (1.5 mM in DMSO or H$_2$O) was applied directly to each leaf of the plant in 5 µl droplets using a Brand Handystep S. The treatments were applied three times a week (directly after irrigation) for two weeks. The leaf stage and the state of the leaves were observed throughout the treatment period.

Figure 8:
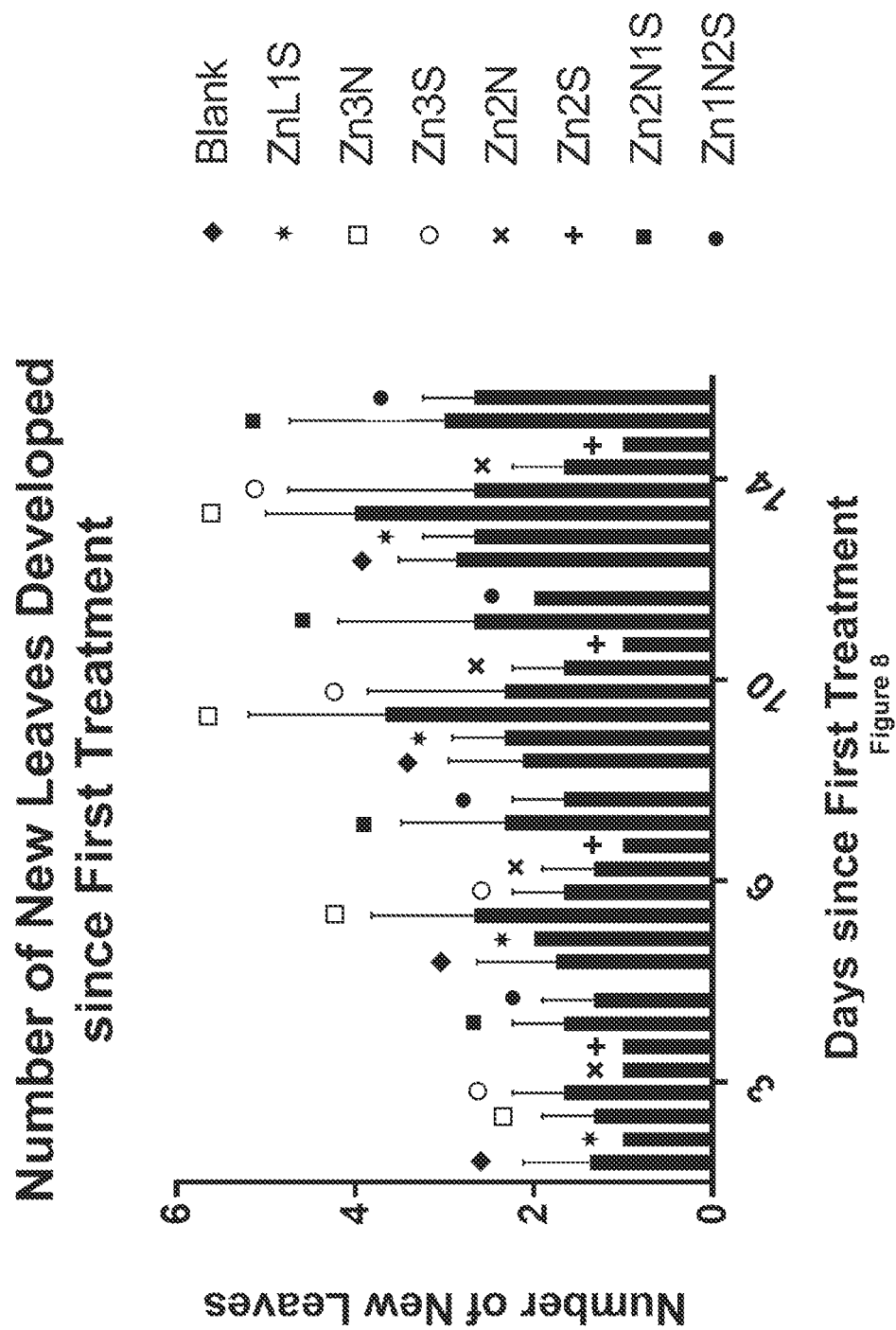
FIG. 8 is a histogram showing the number of new leaves that developed in spinach after treatment with various zinc complexes.

The results are shown in FIG. 8. The Zn3N complex provided a significant improvement in the number of new leaves that were observed (Paired t-test (9)=2.26, p=0.05). The zinc complexes having a tridentate ligand seem to provide better results than the zinc complexes having a bidentate ligand.

For the avoidance of doubt, the entire content of any and all documents cited herein is incorporated by reference into this document.

The invention claimed is:

1. A method of promoting growth in a plant comprising treating the plant with an aqueous solution of a metal complex or a precursor thereof, and promoting growth of the plant, wherein the metal complex comprises a metal selected from the group consisting of zinc (Zn), cobalt (Co), copper (Cu), nickel (Ni) and iron (Fe), and a ligand, which is a bidentate or tridentate ligand.

2. The method according to claim 1, wherein the ligand has a structure represented by formula (Ia):

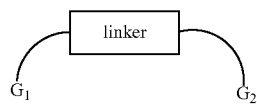

(Ia)

wherein:
the linker has a chain length of at least 3 atoms between $G_1$ and $G_2$;
each of $G_1$ and $G_2$ is a group for coordinating to the metal and independently comprises a heterocyclic group as represented by formula (IIa):

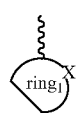

(IIa)

and wherein ring$_1$ is directly bonded to the linker; and X is a heteroatom selected from nitrogen, sulfur or oxygen.

3. The method according to claim 1, wherein the metal is zinc.

4. The method according to claim 2, wherein each of $G_1$ and $G_2$ independently comprises a heterocyclic group having fused bicyclic rings as represented by formula (IIb):

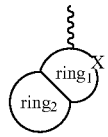

(IIb)

wherein ring$_1$ is directly bonded to the linker, and X is a heteroatom selected from nitrogen, sulfur or oxygen.

5. The method according to claim 2, wherein $G_1$ is an optionally substituted heterocyclic group as represented by formula (IIc):

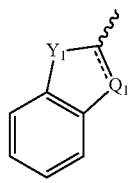

(IIc)

wherein:
$Y_1$ is selected from —CH$_2$—, —NH—, —S— or —O—;
$Q_1$ is selected from —CH$_2$—, —CH—, —NH—, —N—, —S— or —O—;
at least one of $Y_1$ and $Q_1$ is a heteroatom; and
when $Q_1$ is —CH— or —N—, then there is a double bond at the position represented by the dashed line, and when $Q_1$ is —CH$_2$—, —NH—, —S— or —O—, then there is a single bond at the position represented by the dashed line.

6. The method according to claim 2, wherein $G_2$ is an optionally substituted heterocyclic group as represented by formula (IIc):

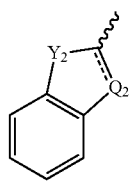

(IIc)

wherein:
$Y_2$ is selected from —CH$_2$—, —NH—, —S— or —O—;
$Q_2$ is selected from —CH$_2$—, —CH—, —NH—, —N—, —S— or —O—;
at least one of $Y_2$ and $Q_2$ is a heteroatom; and
when $Q_2$ is —CH— or —N—, then there is a double bond at the position represented by the dashed line, and when $Q_2$ is —CH$_2$—, —NH—, —S— or —O—, then there is a single bond at the position represented by the dashed line.

7. The method according to claim 2, wherein $G_1$ is an optionally substituted heterocyclic group as represented by formula (IId1):

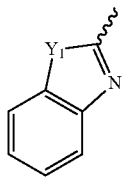

(IId1)

wherein $Y_1$ is selected from —$CH_2$—, —NH—, —S— or —O.

8. The method according to claim 2, wherein $G_2$ is an optionally substituted heterocyclic group as represented by formula (IId2):

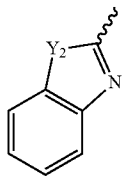

(IId2)

wherein $Y_2$ is selected from —$CH_2$—, —NH—, —S— or —O.

9. The method according to claim 2, wherein the ligand has a structure as represented by formula (Ib):

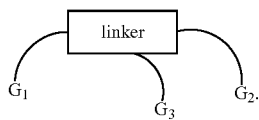

(Ib)

wherein $G_3$ is a group for coordinating to the metal and comprises a heterocyclic group as represented by formula (IIa):

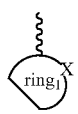

(IIa)

wherein $ring_1$ is directly bonded to the linker; and X is a heteroatom selected from the group consisting of nitrogen, sulfur and oxygen.

10. The method according to claim 9, wherein $G_3$ comprises a heterocyclic group having fused bicyclic rings as represented by formula (IIb):

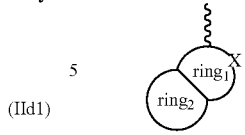

(IIb)

wherein $ring_1$ is directly bonded to the linker, and X is a heteroatom selected from nitrogen, sulfur or oxygen.

11. The method according to claim 9, wherein $G_3$ is an optionally substituted heterocyclic group as represented by formula (IIc):

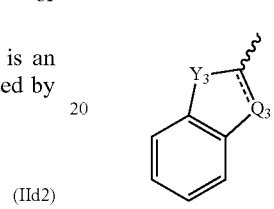

(IIc)

wherein:
$Y_3$ is selected from —$CH_2$—, —NH—, —S— or —O—;
$Q_3$ is selected from —$CH_2$—, —CH—, —NH—, —N—, —S— or —O—;
at least one of $Y_3$ and $Q_3$ is a heteroatom; and
when $Q_3$ is —CH— or —N—, then there is a double bond at the position represented by the dashed line, and when $Q_3$ is —$CH_2$—, —NH—, —S— or —O—, then there is a single bond at the position represented by the dashed line.

12. The method according to claim 9, wherein $G_3$ is an optionally substituted heterocyclic group as represented by formula (IId):

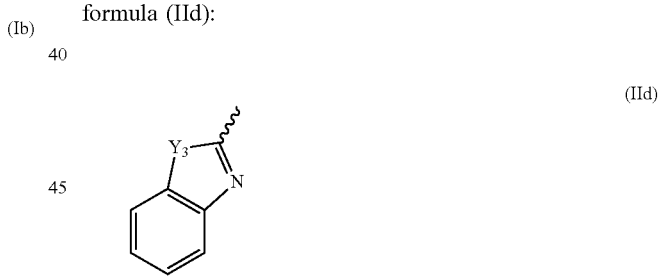

(IId)

wherein $Y_3$ is selected from —$CH_2$—, —NH—, —S— or —O.

13. The method according to claim 2, wherein the ligand has a structure as represented by formula (Ic):

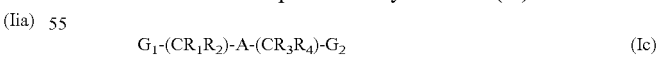

$G_1$-$(CR_1R_2)$-A-$(CR_3R_4)$-$G_2$ (Ic)

wherein:
A is selected from —O—, —S—, —($CE_1H$)— or —$NE_1$-;
$E_1$ is selected from —H, —$(CR_5R_6)$-$G_3$, optionally substituted $C_1$ to $C_6$ alkyl, a water solubilising group or a fluorophore group;
each of $R_1$, $R_2$, $R_3$, $R_4$, $R_5$ and $R_6$ is independently selected from —H, optionally substituted $C_1$ to $C_6$ alkyl, a water solubilising group or a fluorophore group.

14. The method according to claim 13, wherein $E_1$ is —H or —$(CR_5R_6)$-$G_3$.

15. The method according to claim 13, wherein the metal complex is a zinc complex of tris(2-benzimidazolylmethyl) amine; a zinc complex of tris(2-benzothiazolylmethyl) amine; a zinc complex of bis(2-benzimidazolylmethyl) amine; a zinc complex of bis(2-benzothiazolylmethyl) amine; a zinc complex of bis(2-benzimidazolylmethyl)(2-benzothiazolylmethyl)amine; or a zinc complex of bis(2-benzothiazolylmethyl)(2-benzimidazolylmethyl)amine.

16. The method according to claim 1, wherein the treating the plant is by applying the aqueous solution of the metal complex or the precursor thereof to the plant or to the surrounding environment of the plant.

17. The method according to claim 16, wherein the surrounding environment is a circle having a radius of no more than 10 cm with the plant or algae at its centre.

18. The method according to claim 16, wherein the applying the metal complex or the precursor thereof is by spraying a solution of the metal complex or a precursor thereof onto the plant or the surrounding environment of the plant.

19. The method according to claim 1, wherein the plant is a C3 plant, a C4 plant or a CAM plant.

20. The method according to claim 1, wherein the treating the plant with an aqueous solution of a metal complex or a precursor thereof is coating a seed of the plant with the aqueous solution of the metal complex or the precursor thereof.

\* \* \* \* \*